(12) United States Patent
Zhang

(10) Patent No.: US 10,567,276 B2
(45) Date of Patent: Feb. 18, 2020

(54) VIRTUAL NETWORK PRE-CONFIGURATION IN SUPPORT OF SERVICE-BASED TRAFFIC FORWARDING

(71) Applicant: Hang Zhang, Nepean (CA)

(72) Inventor: Hang Zhang, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 106 days.

(21) Appl. No.: 15/440,831

(22) Filed: Feb. 23, 2017

(65) Prior Publication Data
US 2018/0041436 A1 Feb. 8, 2018

Related U.S. Application Data

(60) Provisional application No. 62/399,206, filed on Sep. 23, 2016, provisional application No. 62/376,820, (Continued)

(51) Int. Cl.
*H04L 12/24* (2006.01)
*H04L 12/46* (2006.01)
(Continued)

(52) U.S. Cl.
CPC .......... *H04L 45/30* (2013.01); *H04L 12/4633* (2013.01); *H04L 12/4641* (2013.01);
(Continued)

(58) Field of Classification Search
CPC . H04L 45/30; H04L 12/4633; H04L 12/4645; H04L 45/74; H04L 67/34;
(Continued)

(56) References Cited

U.S. PATENT DOCUMENTS 7,227,863 B1 6/2007 Leung et al.
8,478,902 B1 7/2013 Holland et al.
(Continued)

FOREIGN PATENT DOCUMENTS

CN 101352003 A 1/2009
CN 101808030 A 8/2010
(Continued)

OTHER PUBLICATIONS

International Search Report dated Sep. 27, 2017 for corresponding International Application No. PCT/CN2017/096173 filed Aug. 7, 2017.
(Continued)

*Primary Examiner* — Moo Jeong

(57) ABSTRACT

A method and apparatus for pre-configuring a communication network to support delivery of a service to an end point associated with the service is provided. A virtual network (VN) having a plurality of VN nodes is provided and associated with a respective plurality of physical network nodes of the communication network. Logical tunnels communicatively interconnect the VN nodes. VN virtual routers (v-routers) associated with the VN nodes are provided and configured to route packets between the VN nodes via the logical tunnels. Edge nodes of the communication network are configured to monitor for a packet associated with the service, and to submit the packet to the VN for handling thereby.

34 Claims, 18 Drawing Sheets

Related U.S. Application Data filed on Aug. 18, 2016, provisional application No. 62/371,628, filed on Aug. 5, 2016.

(51) Int. Cl.

| | | |
|---|---|---|
| *H04L 12/713* | (2013.01) | |
| *H04L 12/725* | (2013.01) | |
| *H04L 12/741* | (2013.01) | |
| *H04L 12/751* | (2013.01) | |
| *H04L 29/08* | (2006.01) | |
| *H04W 12/06* | (2009.01) | |
| *H04W 24/08* | (2009.01) | |
| *H04W 4/06* | (2009.01) | |
| *H04W 4/70* | (2018.01) | |
| *H04W 40/00* | (2009.01) | |
| *H04W 40/20* | (2009.01) | |
| *H04W 60/00* | (2009.01) | |
| *H04W 64/00* | (2009.01) | |
| *H04W 72/04* | (2009.01) | |
| *H04W 76/11* | (2018.01) | |

(52) U.S. Cl.
CPC ...... *H04L 12/4645* (2013.01); *H04L 41/0803* (2013.01); *H04L 45/02* (2013.01); *H04L 45/586* (2013.01); *H04L 45/74* (2013.01); *H04L 45/745* (2013.01); *H04L 67/34* (2013.01); *H04W 12/06* (2013.01); *H04W 24/08* (2013.01); *H04W 40/20* (2013.01); *H04W 60/00* (2013.01); *H04W 64/00* (2013.01); *H04W 72/042* (2013.01); *H04W 76/11* (2018.02); *H04L 41/12* (2013.01); *H04L 45/302* (2013.01)

(58) Field of Classification Search
CPC ... H04L 41/12; H04L 45/302; H04L 41/0803; H04L 45/745; H04L 12/4641; H04L 45/586; H04L 45/02; H04L 45/64; H04W 64/00; H04W 76/11; H04W 40/20; H04W 4/70; H04W 72/042; H04W 12/06; H04W 24/08; H04W 60/00; H04W 40/00; H04W 4/06

See application file for complete search history.

(56) References Cited

U.S. PATENT DOCUMENTS

| | | | |
|---|---|---|---|
| 8,660,129 | B1 | 2/2014 | Brendel et al. |
| 9,077,640 | B2 | 7/2015 | So et al. |
| 2003/0041170 | A1 | 2/2003 | Suzuki |
| 2004/0013120 | A1 | 1/2004 | Shen |
| 2007/0117548 | A1 | 5/2007 | Fernandez-Alonso et al. |
| 2007/0153808 | A1 | 7/2007 | Parker et al. |
| 2008/0098472 | A1* | 4/2008 | Enomoto ............... H04L 63/029 726/12 |
| 2008/0192701 | A1* | 8/2008 | Jeong .................... H04W 36/02 370/331 |
| 2010/0074274 | A1* | 3/2010 | Huguies ................ H04L 47/70 370/468 |
| 2010/0189115 | A1 | 7/2010 | Kitada |
| 2011/0111758 | A1 | 5/2011 | Liu et al. |
| 2011/0134931 | A1 | 6/2011 | Merwe et al. |
| 2012/0207026 | A1 | 8/2012 | Sato |
| 2012/0275787 | A1 | 11/2012 | Xiong et al. |
| 2013/0136123 | A1 | 5/2013 | Ge et al. |
| 2013/0336305 | A1 | 12/2013 | Yan et al. |
| 2013/0346585 | A1 | 12/2013 | Ueno |
| 2014/0056298 | A1 | 2/2014 | Vobbilisetty et al. |
| 2014/0269513 | A1 | 9/2014 | Yu et al. |
| 2014/0307556 | A1 | 10/2014 | Zhang et al. |
| 2014/0334485 | A1 | 11/2014 | Jain et al. |
| 2014/0362700 | A1 | 12/2014 | Zhang et al. |
| 2015/0071170 | A1 | 3/2015 | Zhang et al. |
| 2015/0072705 | A1 | 3/2015 | Zhang et al. |
| 2015/0143369 | A1 | 5/2015 | Zheng et al. |
| 2015/0200849 | A1 | 7/2015 | Wen et al. |
| 2015/0257012 | A1 | 9/2015 | Zhang et al. |
| 2015/0271067 | A1 | 9/2015 | Li et al. |
| 2015/0381493 | A1 | 12/2015 | Bansal et al. |
| 2016/0028626 | A1 | 1/2016 | Koganti |
| 2016/0119417 | A1 | 4/2016 | Fang et al. |
| 2016/0134527 | A1 | 5/2016 | Kwak et al. |
| 2016/0150421 | A1 | 5/2016 | Li et al. |
| 2016/0156513 | A1 | 6/2016 | Zhang et al. |
| 2016/0157043 | A1 | 6/2016 | Li et al. |
| 2016/0226755 | A1 | 8/2016 | Hammam et al. |
| 2016/0285736 | A1 | 9/2016 | Gu |
| 2017/0181210 | A1* | 6/2017 | Nadella ................ H04W 48/16 |
| 2017/0201922 | A1 | 7/2017 | Akiyoshi |
| 2017/0250838 | A1 | 8/2017 | Khawer et al. |
| 2017/0374696 | A1 | 12/2017 | Doll et al. |
| 2018/0199276 | A1 | 7/2018 | Zhang |

FOREIGN PATENT DOCUMENTS

| | | |
|---|---|---|
| CN | 102315925 A | 1/2012 |
| CN | 102549990 A | 7/2012 |
| CN | 102611629 A | 7/2012 |
| CN | 103444143 A | 12/2013 |
| CN | 103491006 A | 1/2014 |
| CN | 103553997 A | 1/2014 |
| CN | 103607349 A | 2/2014 |
| CN | 103685026 A | 3/2014 |
| CN | 104285416 A | 1/2015 |
| CN | 105227454 A | 1/2016 |
| CN | 105531961 A | 4/2016 |
| JP | 2003069609 A | 3/2003 |
| WO | 2009054032 A | 4/2009 |
| WO | 2015180617 A1 | 12/2015 |
| WO | 2016014362 A1 | 1/2016 |
| WO | 2013142519 A1 | 9/2016 |

OTHER PUBLICATIONS

International Search Report dated Oct. 27, 2017 for corresponding International Application No. PCT/CN2017/096172 filed Aug. 7, 2017.

International Search Report dated Oct. 26, 2017 for corresponding International Application No. PCT/CN2017/096171 filed Aug. 7, 2017.

International Search Report dated Sep. 28, 2017 for corresponding International Application No. PCT/CN2017/096056 filed Aug. 4, 2017.

International Search Report dated Oct. 23, 2017 for corresponding International Application No. PCT/CN2017/096055 filed Aug. 4, 2017.

Zhang et al., "5G Wireless Network: MyNET and SONAC", IEEE Network vol. 29, Issue: 4, Jul.-Aug. 2015, pp. 14 to 23.

ETSI GS NFV-SWA 001 V0.2.4(Nov. 2014),Network Functions Virtualisation (NFV);Virtual Network Functions Architecture,total 93 pages.

Hang Zhang et al.,"5G wireless network: MyNET and SONAC",IEEE Network ( vol. 29 , Issue: 4 , Jul.-Aug. 2015 ), total 10 pages.

* cited by examiner

VN 1 tunnel description: (only shows a one direction tunnel)
VN ID = 1:
Number of tunnels
For each tunnel
   [Tunnel ID = 1: ingress VN Node ID = 2, egress VN Node ID = 1; QoS (rate)
   Tunnel ID = 2: ingress VN Node ID = 2, egress VN Node ID = 3, QoS (rate)
   ...]

VN 1 VN Node description:
VN ID = 1:
Number of VN Nodes
For each VN Node
   [ VN Node ID = 1, NN ID = 11,
   cluster ID: = 11
       VN Node ID = 2, NN ID = 13,
   cluster ID: = 10
   ...]

VN 1 Device QoS description: (only shows a one direction tunnel)
VN ID = 1:
Device QoS: rate = 500kbps, latency= 100ms VN 1 open tunnel description: (only shows a one direction tunnel)
VN ID = 1:
Number of DL open tunnels
For each DL open tunnel
   [Open tunnel ID = 13: ingress VN Node ID = 2, destination NN ID = 19 ; QoS
   Open tunnel ID = 14: ingress VN Node ID = 2, destination NN ID = 20, QoS]
Number of UL open tunnels
For each of UL open tunnels
   [Open tunnel ID = 15: source NN ID = 19, destination VN Node ID = 3, QoS;
   Open Tunnel ID = 16: source NN ID = 20, destination VN node ID = 3, QoS]

FIG. 3B

VN router 2
VN ID=1:
Destination VN Node ID = 4, tunnel ID = 1;
Destination VN Node ID = 5, tunnel ID = 1;
Destination VN Node ID = 1, tunnel ID = 1;
Destination VN Node ID = 3, tunnel ID = 2;
...]

VN router 1
VN ID=1:
Destination VN Node ID = 4, tunnel ID = 11;
Destination VN Node ID = 5, tunnel ID = 12;
...]

VN router 4
VN ID = 1:
All destination VN Nodes , tunnel ID = 17;

VN router 6
VN ID = 1:
All destination VN Nodes , open tunnel ID = 15;

FIG. 5B

VIRTUAL NETWORK PRE-CONFIGURATION IN SUPPORT OF SERVICE-BASED TRAFFIC FORWARDING

CROSS-REFERENCE TO RELATED APPLICATIONS

This application claims priority from U.S. Provisional Patent Application No. 62/371,628 filed on Aug. 5, 2016, to U.S. Provisional Patent Application No. 62/376,820 filed on Aug. 18, 2016, and to U.S. Provisional Patent Application No. 62/399,206 filed on Sep. 23, 2016, all of which are herein incorporated by reference.

FIELD OF THE INVENTION

The present invention pertains to the field of wireless communication networks and in particular to methods and systems for using virtual networks to support service delivery in wireless communication networks.

BACKGROUND

In current 3G/4G networks, traffic is delivered to user equipment (UE) on a per-device session basis between the UE and a service provider, such as a server. A service session is established after completion of an end-to-end connection setup procedure between the UE and the service provider. This connection procedure typically introduces a latency of about 200 ms and causes considerable network overhead on the link between the UE and the service provider.

It is expected that there will be a significant increase in the number of UEs requiring service in next generation networks (e.g. 5G), such as sensors, machines, mobile devices, and other devices that will require connection. Furthermore, the data traffic will likely may become more bursty in nature with a much higher number of sessions to be served as the demand for continuous or near-continuous connectivity increases.

One of the objectives of next generation networks (e.g. 5G networks) is to provide service-based delivery of content, and avoid the overhead of per-device sessions.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the invention, there is provided a system and method for establishing one or more virtual networks in a communications network to which end devices can connect via wireless communication. According to one embodiment, there is provided a method for configuring a network of physical network nodes to support delivery of a service to an end point accessing the network. The method includes configuring a virtual network (VN) on the network. The VN configuration includes configuring a plurality of VN nodes to define the VN, each VN node associated with a respective one of the physical network nodes. The VN configuration further includes configuring logical tunnels to communicatively interconnect the VN nodes. The VN configuration further includes instantiating VN virtual routers (v-routers) for routing packets between the VN nodes via the logical tunnels. Each v-router is associated with a corresponding one of the VN nodes. VN routers are operative to receive a data packet addressed to the VN and intended for a destination end point. VN routers are further operative to direct the received data packet through a configured interconnecting logical tunnel that connects the VN node of that v-router to a next VN node on the virtual path between that v-router and the destination end point.

According to another embodiment, there is provided n apparatus for configuring a communication network to support delivery of a service to an end point associated with the service. The apparatus includes a processor, a memory and a communication interface. The apparatus is configured, for example by provision of appropriate program instructions for execution by the processor, to operate as follows. The apparatus is configured, prior to receipt of a request for access to the service by the end point, to provide instructions to underlying resources to configure a virtual network (VN) having a plurality of VN nodes associated with a respective plurality of physical network nodes of the communication network. The configuring includes providing logical tunnels communicatively interconnecting the VN nodes. The configuring includes instantiating VN virtual routers (v-routers) associated with the VN nodes. The v-routers are thereby configured to route packets between the VN nodes via the logical tunnels. The apparatus is further configured to provide instructions to the underlying resources to configure one or more edge nodes of the communication network to monitor for a packet associated with the service, and to submit the packet to the VN for handling thereby.

BRIEF DESCRIPTION OF THE FIGURES

Further features and advantages of the present invention will become apparent from the following detailed description, taken in combination with the appended drawing, in which:

FIGS. 3A & 3B illustrate an aspect of configuration of the network of FIG. 1, including description of a virtual network.

FIGS. 5A & 5B illustrate another aspect of configuration of the network of FIG. 1, including virtual network router routing table configuration.

DETAILED DESCRIPTION

Figure 1:
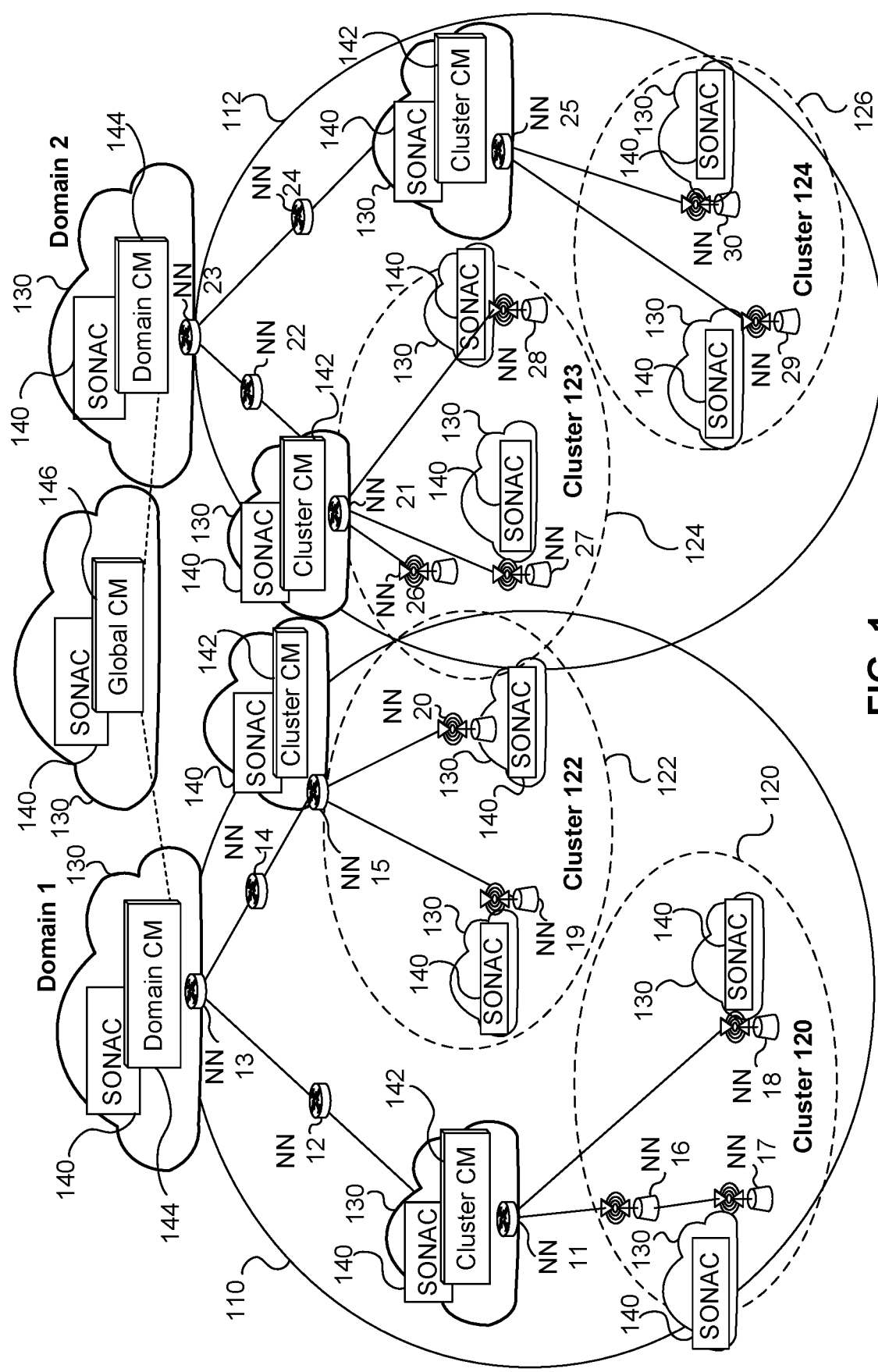
FIG. 1 illustrates a network which is configurable according to embodiments of the present invention.

As used herein, a communication network (or simply a "network") refers to a collection of communicatively coupled devices which interoperate to facilitate communication between various end point devices, such as User Equipment devices. The term "User Equipment" (UE) is used herein for clarity to refer to end point devices which are configured to communicate with a network either via fixed line connection, or via radios operating according to a predetermined protocol. UEs include UEs as defined by the $3^{rd}$ Generation partnership project (3GPP), mobile devices (e.g. wireless handsets) and other connected devices, including Machine-to-Machine (M2M) devices (also referred to as Machine Type Communications (MTC) devices). A mobile device need not be mobile itself, but is a device that can communicate with a network which is capable of providing communication services as the device moves. A network may include, for instance, at least one of a radio access portion which interfaces directly with UEs via radio access and a fixed line portion which interfaces directly with UEs via fixed line access, in combination with a backhaul portion which connects different network devices of the network together. The network may further comprise various virtualized components as will become readily apparent herein. A primary forward looking example of such a network is a Fifth Generation (5G) network.

It has been proposed that 5G networks be built with various network technologies that allow for the network to be reconfigured to suit various different needs. These technologies can also allow the network to support network slicing to create different sub-networks with characteristics suited for the needs of the traffic they are designed to support. The network may include a number of computing hardware resources that provide processors and/or allocated processing elements, memory, and storage to support functions executing on the network, as well as a variety of different network connectivity options connecting the computing resources to each other, and making it possible to provide service to mobile devices.

A service generally corresponds to a source, or a sink, for specified data communications that is available on the network. Accessing a service may involve communication between multiple end points that are connected to the network. A service may be provided by the network operator, or may be provided by network customer such as a business, utility, government, or other organization. Examples of services include, but are not limited to, providing audio and/or video content to stream or download to an end point such as a UE, storage and/or processing of data from an end point such as a UE, UE-to-UE messaging services, machine-to-machine communications such as utility meter reporting, remote data storage, and/or remote computing services.

A network slice generally corresponds to a set of network resources which have been allocated to support at least one specific service on the network. Such network resources may include cloud-based communication, computing and memory resources, physical connection and communication resources, wireless radio access resources such as frequency, time and code multi-access resources, telecommunication resources, memory resources and computing resources.

As used herein, the term virtual network (VN) refers to a pre-configured network topology including a collection of pre-configured virtual network nodes which are communicatively interconnected to support one or more network slices. The VN is identified by a VN identifier (VN ID). If the VN supports a single network slice (i.e. a single service), that slice may also conveniently be identified by the VN ID. If the VN supports a plurality of network slices, a service identifier (service ID) may be used to differentiate between each of the supported plurality of network slices, to identify which slice is allocated to which service as supported by that VN. The plurality of network slices are logically separated from one another within the VN, but all of the network slices within a VN share a common set of network resources that have been configured for that VN. In this case, a slice can be identified using a combination of a VN ID and a service ID.

More particularly, a VN is composed of a collection of VN nodes each of which is associated with one of a corresponding collection of physical network nodes that make up the network. The VN nodes are communicatively interconnected, either directly or indirectly via other VN nodes. Each VN node is associated with, and communicatively linked to, a corresponding physical network node of the network. In some embodiments, operational capacities of the VN nodes may be co-located with their associated physical network node. In some embodiments, operational capacities of one or more of the VN nodes may be physically separated from their associated physical network node. The VN may further include definitions and functional elements to provide connecting tunnels, associated routing functions, packet aggregation functions, packet de-aggregation functions, firewall functions, anchor point functions, in-network processing elements, admission control, and access link scheduling and management, that is arranged to support the one or more network slices across the collection of VN nodes.

For example, the association may be such that a packet received at a physical network node is provided to the VN node associated with that physical network node for processing (e.g. under predetermined conditions), and packets provided by the VN node may be transmitted by the physical network node as instructed by the VN node, or the pre-configured rules for that VN. The VN nodes can be instantiated using computing, communication, and memory resources such as network function virtualization resources. These resources can be located in a cloud, such as a datacenter or local cloud. The local cloud may include generic hardware proximate or co-located with the associated network node. A VN node may comprise a network function or a group of network functions. The logical topology of a VN refers to the interconnection among multiple VN nodes which are distributed at various associated physical network nodes.

A VN tunnel refers to a logical communication link between two VN nodes. An open VN tunnel refers to a logical communication link between a VN node and another network node which is neither associated with a VN node nor a VN specific network function. The other network node may be, for instance, an edge node of the network, such as an access node or a gateway. Edge nodes provide connectivity for mobile or fixed end points (or "end nodes") to connect to the network. End points may include, for instance, UEs and other devices external to the network, such as application servers, which attach to the VN access the service(s) supported on that VN.

A network entity generally refers to a network node, or a combination of network nodes, that is operative to provide specified services on the network. A network entity comprises physical components, such as processors, allocated processing elements, or other computing hardware, computer memory, communication interfaces, and other supporting computing hardware. The network entity may use dedicated physical components, or the network entity may be allocated use of the physical components of another device, such as a generic computing device or resources of a datacenter, in which case the network entity is said to be virtualized. A network entity may be associated with multiple physical components that may be located either in one location, or may be distributed across multiple locations.

A network function comprises a service that may be provided by a network entity, or may comprise physical components configured in a certain way to provide a given functionality, which may be described in terms of data inputs and outputs. In general, a network entity may be operative to support one or more network functions on the network.

General Description

Embodiments of the present invention provide for delivery of one or more services from at least one network entity available on a network. Rather than the network acting only to connect end points to the network entity, the network is configured to participate in providing the service. In particular, a VN is instantiated and pre-configured on the network for providing delivery of the service(s). The VN is pre-configured in such a way that end points are able to connect to a desired service with limited to no signaling across the network at the time of service usage, and therefore limited latency. This is enabled by the pre-establishment of the VN on the network, which effectively extends the service from the network entity across the network to the point of attachment by the end point. Pre-configuration of edge nodes may also enable this feature. When the end point attaches to the VN, it gains access to the service, without signalling between the end point and the network entity that provides the service.

Because the network participates in service delivery, the service is expanded into the network by the use of virtual network nodes. The virtual network nodes can recognize incoming data packets associated the service and route them appropriately via the pre-established tunnels.

The pre-configured VN is operative to recognize incoming data packets associated the service and to route them appropriately via the pre-established tunnels. This operation is supported by VN routing functions (v-routers) and VN tunnels which are established for providing the service. The VN nodes can also perform other functions of the service such as packet aggregation or de-aggregation, firewall and/or security functions, anchor point operation functions, in-network processing and data storage, admission control, and access link scheduling and management.

The v-routers are configured to route packets between the VN nodes via the tunnels, in a hop-by-hop (tunnel-by-tunnel) manner. Packets are routed toward an appropriate destination, such as but not necessarily limited to a destination specified in the packet using a name identifier or explicit destination identifier. Physical network resources, such as network nodes, are configured to provide the VN tunnels as part of the VN tunnel definition. VN tunnels can be supported by a chain of physical network nodes which are configured to forward tunneled packets toward the VN tunnel egress. In some embodiments, each physical network node supporting a tunnel may be configured with a set of routing rules which associates a VN tunnel identifier or destination network node identifier with a next network node. When a packet specifies the VN tunnel identifier or destination network node identifier, it is forwarded to the associated next network node.

For example, when the service involves processing of data transmitted by UEs in a certain manner, and providing results of this data processing to the UE or another UE, some or all of the processing may be done at virtual network nodes proximate to the network edge, thereby reducing service latency. The location of VN nodes performing in-network data processing and/or data caching can be selected based on criteria such as but not limited to: performance, cost, latency, communication overhead, and quality of service.

In various embodiments, the pre-configuration of the VN provides a network infrastructure that stands ready to handle packets according to a requested service. This allows end points to reduce signaling because the details of how the packet is to be treated are specified in advance when the VN is pre-configured. This also allows for lower latency, because tunnel set-up, service function set-up, end point tracking, etc. are performed in advance. Each VN node is in standby across the network ready to receive and handle any packets directed to a service supported by that VN. In addition, because service functions can be embedded in the network (even possibly at the edge nodes or in radio access network (RAN) clusters), data forwarding and associated latency and network resource usage can be reduced.

Network pre-configuration may be performed by a network entity referred to as a Service Oriented Network Auto Creation entity (SONAC). The SONAC is described for example in Zhang, Hang, et al., "5G Wireless Network: MyNET and SONAC", IEEE Network Volume: 29, Issue: 4, July-August 2015, pp 14 to 23, which is incorporated herein by reference. The SONAC may perform and/or direct underlying network resources to instantiate and configure the VN as described herein. As used herein, SONAC functionalities can be subdivided into functions used for network slice composition, referred to as SONAC-Com, and functionalities used for network slice operation, referred to as SONAC-Op. The SONAC may comprise operations for performing software-defined topology definition (SDT), software-defined resource allocation (SDRA), and software-defined protocol definition (SDP). SDT, SDRA and SDP in support of SONAC-Com and SONAC-Op are referred to as SDT-Com, SDRA-Com, SDP-Com, SDT-Op, SDRA-Op and SDP-Op, respectively. SONAC-Op may be dedicated to managing a single network slice, or common to multiple network slices managed thereby. SONAC-Op may be supported on its own network slice or on a network slice used to support multiple entities. The concept of network slices provides operators the flexibility to provide network infrastructure resources that may be tailored to satisfy the wide variety of customer service and quality requirements.

The present application describes a "Hop-On" concept which allows end-point devices (e.g. UE) to connect and disconnect from the slice (VN) directly, rather than needing to complete end-to-end connections as is presently the case. This significantly simplifies the data traffic delivery procedure and reduces signaling overhead and latency across the network. In the Hop-On VN traffic delivery system and method, access to a service does not require per-UE per-session establishment, and does not require end-to-end connection setup between the UE and the service provider. There is no session setup as the session is effectively "pre-existing" as a VN slice pre-established on the network. The VN slice supported by a pre-defined VN topology configured on the network. The UE only needs to negotiate its entry or exit from the slice which may occur at a localized level (e.g. at the edge of the VN). The connection between the slice access point and the service provider is established and maintained by the control functions managing the slice.

Slicing and Hop-On together enable:

Scalability—Physical Network Nodes (NNs) are operative on the service level (integrated data traffic of a service), instead of on device/session level Simplicity—Per device/session end-to-end tunnel establishment is removed or minimized Flexibility—service-customized VN/slice—allows the communications network to be adjusted for individual services, to provide a best fit for the needs of customers and network operators For example, end-points of a VN designed for such services can hop-on the VN by sending data packets using a pre-assigned Access Link (AL) resource for that VN. The end-point UE can register and connect with a local node at the edge of the VN, rather than the destination end point of their communications. Once data packets for a service are submitted to the network, the packets are routed to the intended destination(s) along pre-defined VN tunnels, and can be separated by service or QoS as required. For VNs where there is no pre-assigned AL resource, a simplified set of signaling message exchanges on the AL may be used to enable data packet transmission over the AL. From the point of view of communicating devices, the network is always ready to receive and deliver data traffic.

Once the VN has been established, data traffic delivery to a mobile UE relies upon the selection of the right tunnel(s) when routing the data traffic, instead of the re-establishment of new per-device end-to-end connections. Accordingly end points, such as UE or business customers, are able to exchange traffic with a local NN without regard for the location of the intended recipient, or the condition of the network between the sender and the recipient. Similarly, NNs located logically distant from the destination end point do not need to know the logical or physical address of the destination end point. Instead, these NNs need only follow the pre-defined rules for handling packets and direct the packets to an assigned NN that is operative to maintain or obtain the current location of the destination end point.

When communicating to mobile UE, one or more tunnels connecting Access Points (APs) of a Radio Access Network (RAN) cluster can be selected by a v-router at the cluster level to selectively enable data delivery to the one or more APs. Accordingly, the decision-making regarding the best mode to reach a recipient UE may be decided at the lowest level which has the most accurate position and mobility information related to the recipient UE. With this functionality, true handover-free service access is enabled. The end-points of the communication can communicate with a correspondent party using a name (UE ID and a service ID) in place of location information. The hierarchical VN architecture enables the v-routers to handle the traffic on an end-point name basis, and access name-based location tracking and resolution from the CM's configured for that VN.

By using a pre-defined VN, data packets from specific applications, such as peer-to-peer communication (e.g. we-chat), can be directly routed to the destination end point via efficient tunnel routing, i.e., shortest route without going through un-necessary paths. CM techniques provide the location information to VN routers to enable the efficient data delivery.

From the end point (e.g. UE or server) perspective, the hop-on process starts with network registration: to obtain authentication and authorization to use the network, followed by registration to a CM slice to start reach-ability operation to enable the network to track the end point's location. The location tracking may be initiated before the end point is registered to a user plane (UP) of the VN (slice). The next step is registration to a UP slice to authorize the end point to use the UP slice and obtain information on any requirements for admission control (AC) for follow-up service data transmission. If no further AC is required, the end-point can Hop-On, or access, the slice to directly send data over the VN. For most MTC cases, the above procedure can be simplified. If further AC is required for a service, before sending any data traffic an AC procedure is needed (e.g. for some bulk data transmission over a slice with limited VN capacity, an AC is needed before access is provided to the slice).

Embodiments of the present invention relate to the interactions between an end point, such as a UE, computing device, or customer server, and an edge node, such as an access point of a radio access portion of a communication network. In some embodiments, the end point may be a server or other networked device, and the corresponding edge node may be a gateway of the communication network. Some embodiments provide for an end point or method of operating same, while other embodiments provide for an edge node or method of operating same. The interaction between edge nodes and end points supports VN operation, so as to allow end points to access the VN and to convey packets between the end points and the VN.

FIG. 1 illustrates an example of a network infrastructure which may be configured and utilized according to some embodiments of the present invention. It should be understood that this network infrastructure and its topology is used as an example only, and is not intended to limit the present invention.

To assist with tracking the location of UE accessing the network, the network can be divided into domains, such as Domain 1 110 and Domain 2 112 illustrated in FIG. 1. Each domain may be further sub-divided into RAN clusters 120, 122, 123, 124. For expediency, FIG. 1 illustrates two domains and two hierarchical layers, namely a domain layer and a cluster layer, however other embodiments may include various numbers of domains and more or fewer layers, as may be applicable for a particular network. The specific domain division and sub-division may be implementation-specific and based on network requirements.

FIG. 1 illustrates multiple physical network nodes (NNs) labelled NN 11 to NN 30. FIG. 1 further illustrates multiple network entities which are provided in the form of VN functions supported by computing resources 130. The network entities 140, 142, 144, 146 are instantiated using the computing resources 130 such as reconfigurable in-network resources, or cloud or datacenter resources. The computing resources 130 may comprise, for instance, a data center, server, or virtualized cloud resources available to particular NNs. Generally, VN nodes are associated with a corresponding computing resource 130, and accordingly physical nodes that are not allocated computing resources 130 would not be allocated as VN nodes.

The illustrated network entities include SONAC entities 140 and CM entities including cluster CM entities 142, domain CM entities 144 and a global CM entity 146. Each network entity 140 to 144 may associate with the network node at which it is located. The global CM entity 146 may associate with another network node (not shown), or may be supported as a separate management node that manages and directs operations in the two Domains 110, 112.

The SONAC architecture formed of SONAC entities 140 is used for pre-configuring and managing VNs which include VN nodes associated with at least some of the network nodes. The SONAC may also manage operations of the physical network nodes NN 11 to NN 30. The interconnections between SONAC entities at different layers of the architecture are not shown for the sake of clarity. SONAC-Com functions supported by the SONAC entities 140 and CM functions supported by the CM entities 142, 144, 146 can be pre-realized before any service slice is defined and implemented. SONAC-Op can be pre-realized if it controls and manages all slice operations. Alternatively, a SONAC-Op can be created together with a service slice if the SONAC-OP is dedicated to that service slice.

The network infrastructure further includes a hierarchical connectivity management (CM) entity formed of CM entities 142 to 146. The interconnections between CM entities at different layers of the architecture are not shown for the sake of clarity. The CM entity may be configured to track current locations of end points such as UEs, and to provide such location information to network nodes and/or SONAC components as required.

The network infrastructure further includes RAN clusters 120, 122, 123, 124, which include multiple radio access network nodes ("access nodes") in a common area. The access nodes in the RAN cluster are interconnected via wired or wireless communication links. Alternatively, at least some access nodes may be provided in a non-clustered configuration. The access nodes may each include their own full or partial baseband processing infrastructure, and some or all of the baseband processing infrastructure may be shared by multiple access nodes. The access nodes may be provided with or without computing resources 130, or may share a set of computing resources 130 made available to multiple access nodes. RAN clusters can be used as part of the VN. Further, packets may in some cases be wirelessly transmitted to and from RAN clusters using multipath, multicast or broadcast transmissions.

Pre-configuration of the VN according to various embodiments of the present invention are described as follows. The pre-configuration includes configuring logical VN tunnels between VN nodes. The pre-configuration includes configuring VN nodes as VN routers which are operative to route packets in a hop-by-hop manner between VN nodes using the logical tunnels. The pre-configuration includes the configuration of underlying physical network resources, such as network nodes, to provide the VN tunnels as part of the VN tunnel definition. The pre-configuration includes configuring edge nodes, such as network nodes, access nodes and/or gateway nodes, to identify packets associated with the service and to forward such packets toward the VN for handling, and/or to receive service packets from the VN and forward such packets toward designated end points. In other embodiments, one or more of the above pre-configuration operations may be omitted.

In some embodiments, the pre-configuration includes the configuration of VN nodes to implement some or all functions of the service, such as in-network data processing and in-network data storage or retrieval. For example, when the service involves processing of data transmitted by UEs in a certain manner, and providing results of this data processing to the UE or another UE, some or all of the processing may be done at VN nodes proximate to the network edge, thereby reducing service latency. The location of VN nodes performing in-network data processing and/or data caching can be selected based on criteria such as but not limited to: performance, cost, latency, communication overhead, and quality of service.

Figure 2:
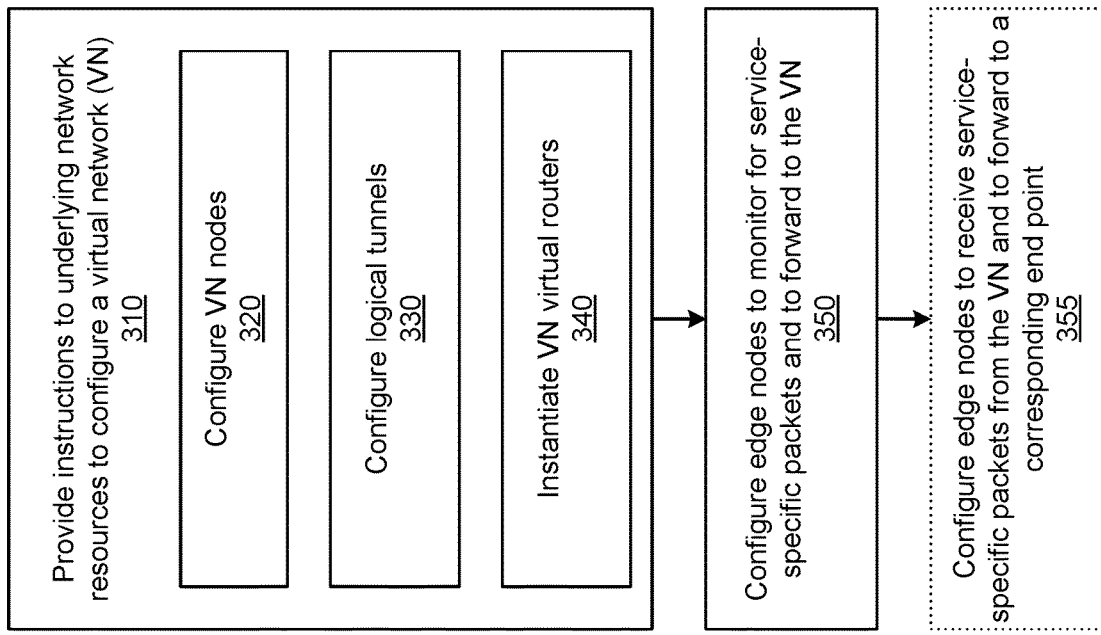
FIG. 2 is a flow chart illustrating operations performed in accordance with embodiments of the present invention.

Embodiments provide for a method and apparatus for configuring a network to support delivery of a service to an end point associated with (e.g. subscribing to) the service. The apparatus may include, and the method may be performed by, a network entity such as a SONAC. Typically, the service is delivered to multiple end points, such as UEs, at different geographic locations. The configuration is performed prior to receipt of a request (by end points) for access to the service. Having reference to FIG. 2, the configuration includes providing 310 instructions to underlying resources to configure a VN. The VN configuration includes configuring 320 a plurality of VN nodes, each VN node associated with a respective physical network node of the network. The VN may be pre-existing or instantiated as part of the configuration.

Underlying resources may include, for example, configuration functions which operate to instantiate and/or configure other functions in the network, such as functions generating VN nodes. Underlying resources may include local agents or aspects of SONAC. Underlying resources may include computing resources configured according to computer program instructions to carry out predefined instructions.

Configuring the VN further includes configuring 330 logical VN tunnels to communicatively interconnect the VN nodes. A VN node at the end point of a logical VN tunnel can transmit a packet via the logical tunnel by providing the packet thereto using a variety of approaches, such as writing the packet to a predetermined memory location. Underlying physical network resources, such as network nodes, are configured to provide the VN tunnels as part of the VN tunnel definition. As such, a mapping between VN tunnels and underlying physical network resources used for conveying VN tunnel packets can be provided.

Configuring the VN includes instantiating 340 VN virtual routers (v-routers) which are associated with the VN nodes. The v-routers are configured to route packets between VN nodes via the logical VN tunnels. Packets may be routed toward a destination in a multi-hop manner by transmitting the packet to an intermediate v-router, and forwarding the packet from the intermediate v-router. Routing may be performed according to a name identifier of the routed packet, where the name identifier correlates to a destination end point whose location is being tracked and provided to the v-routers. Tracking may be performed by one or more connection management functions, for example. The v-routers are virtualized functions and therefore are associated with physical network nodes and provided using configurable resources such as cloud-based resources. Packets transmitted by the end point and received by the edge node may specify a name identifier which is separate from and independent of the destination's location. The name identifier is or refers to a substantially unique name or identification number of the destination device, which is tracked by entities operating in the network, such as CM and v-router entities.

Configuring the network includes configuring 350 one or more edge nodes of the network to monitor for service-specific packets, i.e. packets which are associated with the service, and to submit such packets to the VN. In some embodiments, such packets may be identified by the inclusion of a service-related identifier, such as a VN ID or a VN ID in combination with a service ID. As such, edge nodes may be configured to monitor for an identifier contained in packets received at the edge node, the identifier associated with the service. Additionally or alternatively, edge nodes may be configured to monitor for use of dedicated access link resources in transmitting packets to the edge node, the dedicated access link resources associated with the service. The packets may be submitted to the VN for example by forwarding the packets toward a VN node or v-router which is co-located with the edge node or located at another network node communicatively coupled to the edge node. Configuring the network may further include configuring 355 one or more of the edge nodes to receive packets from a VN node and to transmit such packets to a corresponding end point which is communicatively coupled to the edge node, and associated with the VN. The edge nodes may be configured to mark such packets as being associated with the service.

Embodiments provide a network configured according to the above-described method and/or using the above-described apparatus.

As noted above, embodiments of the present invention involve configuration of a VN. The logical topology of the VN may be designed, and associated network functions can be instantiated or activated prior to its configuration. The configuration can include topological configuration and resource allocation configuration, for example as performed by the SDT-Com and SDRA-Com components of SONAC-Com, respectively.

As part of the VN configuration, SDT-Com may provide a description of the VN, including the VN nodes, VN logical topology, VN open logical topology, and end point Quality of Service (QoS) parameters.

The description of a VN node may include one or more of: a VN node ID, an identity (ID) of a physical network node to which the VN node associates, and an ID of a domain or cluster for which the VN node is the anchor point. The identity of the physical network node may indicate a physical location of the VN node and/or a network address of the network node, for example.

Logical tunnels interconnecting the defined VN nodes are provided and/or defined, for example by SDT-Com. To this end, and in various embodiments, a VN logical topology description and/or a VN open logical topology description are provided.

The VN logical topology description may include a set of logical VN tunnel IDs for all VN tunnels of the VN. For each logical VN tunnel, the description may indicate end point VN nodes of the tunnel, such as the VN node ID of a tunnel ingress point and the VN node ID of a tunnel egress point. QoS parameters of a tunnel may also be indicated in the description. QoS parameters may include, for example, tunnel data throughput parameters and tunnel process latency parameters.

The VN open logical topology description may include a set of logical VN tunnel IDs for all open VN tunnels of the VN. For each open VN tunnel, the description may indicate an end point VN node of the open tunnel, such as the VN node ID of a tunnel ingress or the VN node ID of a tunnel egress. When an ingress VN node ID is specified for an open tunnel, the destination network node ID (address) may also be specified. QoS parameters of an open tunnel may also be indicated in the description. Open VN tunnels may specify one of the VN nodes as a first end point of the open tunnel and allow another end of the open tunnel to be dynamically specified as a node of the network other than the VN nodes. The QoS of an open tunnel may specify the total throughput of a slice/service, and/or the latency of the open tunnel. The QoS parameters may be used by SDRA-Op at edge nodes (for example by an access link scheduler) during the VN/slice operation.

The end point or per-device QoS parameters may include parameters such as per-device data rates and latencies. The QoS parameters may indicate QoS requirements for providing adequate service to the end points. All end points may have the same QoS parameters or different end points may have different QoS parameters.

SDT-Com may further configure the SDT-Op component of SONAC-Op, as the SDT-Op component relates to the VN. SDT-Op can be used to support configuration and/or operation of the v-routers and VN tunnels. This aspect includes association of VN nodes to v-routers, for example by pairing VN node IDs with v-router IDs. This aspect further includes configuring VN tunnels, for example by associating a VN tunnel ID with an egress VN node ID (indicative of the VN node at the tunnel egress) and QoS parameters for the tunnel. This aspect further includes configuring open VN tunnels, for example by associating an open VN tunnel ID with an egress VN node ID which provides packets or a destination network node ID which receives packets. This aspect further includes configuring v-router routing tables, for example by associating destination VN node IDs (indicative of a VN node for which a routable packet is destined) with a next VN node ID (indicative of a VN node to forward the routable packet to as part of a multi-hop process for forwarding the packet toward the destination VN node). The destination VN node ID may further be associated with an end point for which the destination VN node acts as an anchor node.

VN virtual routers (v-routers) associated with VN nodes are defined and/or instantiated, for example by operations of SDT-Com and/or SDT-Op such as those described above. By way of such configuration, the v-routers are configured to route packets between VN nodes via logical tunnels.

The routing tables of v-routers may be pre-configured in a variety of ways. The routing table of a v-router may associate a packet's service-related identifier (such as a VN ID or a VN ID in combination with a service ID) and its name identifier with one of the logical tunnels accessible to the v-router, said one of the logical tunnels forming part of a multi-tunnel link to the packet destination. In some embodiments, the v-router is configured to adjust the associations, stored in its routing table, between logical tunnels and name identifiers based on a current location of a destination device corresponding to the name identifier. The current location of the destination device may be obtained via interaction with an appropriate connectivity manager (CM) entity.

In some embodiments, the routing tables may be provided in a two-part format. A first part of the routing table specifies associations between destination VN nodes and next logical tunnels to use for forward packets toward such destination VN nodes. A second part of the routing table specifies associations between destination end points (such as mobile UEs) and anchor VN nodes which are currently in communication with the destination end points. The two parts of the routing table may be provided as separate routing tables, which can be used together to route packets toward a specified destination end point via an associated anchor VN node.

The v-routers may thereby self-adjust routing operations based on tracked locations of mobile end points. As such, VN routing depends on end point location. VN routing, for example as performed collectively by multiple v-routers sequentially treating a packet in a multi-hop manner, may further include selecting an efficient VN tunnel path by which to route packets according to the service. The path selection may be adjusted based on a current location of the (potentially mobile) end point.

In some embodiments, a particular VN node may be designated as an anchor point of a mobile end point, based on proximity or registration of the end point with the VN node. VN routing then includes routing packets destined for the end point via the anchor point. V-routers may be pre-configured to route packets to VN nodes potentially acting as anchor nodes. The v-routers may further be pre-configured to receive and store associations between end points and anchor points as these associations are dynamically provided, and to route packets toward designated end points by routing them toward the anchor points associated with the designated end points. A VN node may be designated as an anchor point for a domain or RAN cluster, for example. Anchor points may track end points which are reachable from the anchor point and cause packets to be forwarded to these end points.

As another part of the VN configuration, v-routers may be associated with a CM entity. In some embodiments, each v-router may be associated with one or more CM components of a hierarchical CM entity. The association may be performed by SDT-Com, and may include associating a v-router ID with a CM ID indicative of a particular CM component. The association is used for providing location information from the CM to the v-routers, for example. The CM entity may have multiple hierarchical levels, and a v-router may be associated with one or more of these levels. An association may involve configuration of one or both of the v-router and the CM component to communicate via control messaging. The v-routers are configured to update routing tables based on CM input. Routing tables, establishment and tear-down of virtual links can be updated based on end point location and activity information derived from CM input.

The CM entity may also be pre-configured to track the location of mobile end points and provide location information to v-routers. The CM entity can be provided as a tree hierarchy of local to more global CMs, which cooperate to provide location updates. When a lower-level CM lacks current location information, it may query a higher-level CM. When a higher-level CM registers a location update, it may pass the update to lower-level CMs immediately, on a schedule, on a trigger, or upon request. V-routers may request location updates from the CM entity and/or the CM entity may provide location updates to v-routers as they are registered by the CM.

As another part of the VN configuration, a QoS definition of the VN tunnels is provided, for example by SONAC-Com. Topology of the VN can be configured based on statistics of data traffic attributes, geographic distribution of end-points and quality requirements. SONAC-Com may determine the QoS of a VN tunnel by estimating the number of devices which will exchange data traffic via the tunnel, and also estimating the integrated rate requirement of the VN tunnel based on per device traffic attributes. Similarly, for a RAN cluster, the QoS of a tunnel or open tunnel may be defined based on data traffic statistics. Alternatively, in some embodiments, a VN tunnel definition may not explicitly indicate QoS. In this case, a VN tunnel may be defined only by its ingress VN node ID and egress VN Node ID.

In some embodiments, a service supported by a VN may involve transmission of more than one type of packet, with each type of packet requiring different treatment by the VN. For example, different packet types may have different QoS requirements, sizes, traffic characteristics, service function requirements, or routing requirements. To differentiate between different packet types of a single service, a packet type ID or priority header can be used. Each different packet type may be assigned a different ID or header, which is included in packets having the corresponding type. The VN may be pre-configured to monitor for and recognize such IDs or headers and treat packets according to type.

Following configuration of the logical VN, for example by operation of SDT-Com as described above, logical tunnels are mapped to physical network resources. This resource mapping is performed as part of the provision of the logical tunnels interconnecting the VN nodes. The resource mapping can be carried out for example by the SDRA-Com component of SONAC-Com.

In various embodiments, each logical tunnel may be associated with one or multiple physical paths and one or multiple hops through the network. Packets transmitted via a logical tunnel thus traverse one (or more) of the physical paths and may be received and forwarded by intermediate physical network nodes, thereby undergoing multiple hops. For each logical tunnel of a VN, SDRA-Com is configured to determine the association between logical tunnels and physical resources, which may be in the form of a mapping format as described below. SDRA-Com is further configured to direct configuration of the underlying physical network nodes (NNs) to implement the logical tunnels.

There are multiple possible mapping formats, examples of which include an IP-like routing format, a source-based routing format, a destination-based routing format, and a dedicated resource-based routing format. The NNs may be configured with an indication of the mapping format being used. For destination-based routing, each NN may be configured to implement a forwarding rule which, based on a packet having a given service-related identifier ID, specifies a name identifier, a QoS requirement, and a next-hop NN ID corresponding to the next NN designated to receive the packet. For dedicated resource-based routing, each NN may be configured to implement a forwarding rule which, based on a packet having a given service-related identifier, specifies a dedicated communication resource which is to be used to forward the packet. Dedicated resources may be a lambda or sub-spectrum frequency band, for example.

In various embodiments, edge nodes (such as radio access nodes) communicating with end points (such as UEs) via radio access links can use either dedicated communication resources or shared communication resources for the purposes of transmitting and receiving packets of the supported service. In some embodiments, dedicated communication resources may be dedicated to a specific set of UEs and/or services, but may nonetheless be shared between such a set. Communication resources, also referred to as air interface resources, may include, for example, time slots, frequency bands, and/or spreading codes.

As such, when the NN being configured is an edge node which communicates with an end point via a radio access link, the mapping format may be a dedicated resource format or a shared resource format. For the dedicated resource format, a NN may be configured to associate a specified service-related identifier (e.g. VN ID and/or service ID) with a specified set of access link resources to use in transmitting and/or receiving packets according to the associated service. For the shared resource format, a NN can be configured with an indication that no dedicated access link resources are assigned, or alternatively the NN may utilize shared access link resources for transmission and reception by default.

In various embodiments, the SDRA-Op component of SONAC-Op is configured. The configuration of SDRA-Op may be considered to be an operation of the VN configuration in general, and of SDRA-Com in particular. That is, SDRA-Com may configure SDRA-Op. Aspects of this configuration are described below.

During operation of the VN, SDRA-Op assigns resources to handle data packets exchanged between end points. To support this function, embodiments pre-configure SDRA-Op based upon the QoS requirements for VN tunnels handled thereby, as well as potential QoS differences between packet types. For example, SDRA-Op may be configured to assign resources of the physical network, such as communication spectrum of communication links, and communication and computing operations of network nodes, according to predetermined rules. SDRA-Op may operate at the transport network, RAN clusters, and access links of the communication network, for example, in order to configure mapping rules used for mapping between VN tunnels and physical infrastructure of the communication network. Multiple mapping rules may be available for configuration and/or selection. Resource assignment by SDRA-Op may be ongoing, for example in order to satisfy QoS requirements given rate requirements and traffic levels. The rules used by SDRA-Op to assign resources may be configured by SDRA-Com. Physical network resources can be allocated to support a VN tunnel (and/or VN node) based on QoS requirements of the VN and estimates of amounts of data traffic associated with the service which is expected at the VN tunnel.

In some embodiments, when a VN tunnel is supported by multiple parallel physical communication links, SDRA-Op may allocate traffic to the multiple paths, for example via traffic engineering.

In various embodiments, as part of SDRA-Op configuration, RAN cluster resource allocation is configured. The integrated rate requirement at a RAN cluster (service level) is estimated and indicated (e.g. by SDRA-Com) to an instance or portion of SDRA-Op. SDRA-Op is configured to assign resources to connected end points based on the estimated integrated rate requirement, in order to meet a specified service level QoS without over-provisioning resources. Further, for an access link, a per-device service requirement may be indicated to the access nodes such that the access link (AL) scheduler determines appropriate resource assignments for the connected devices.

In various embodiments, the SDRA-Op associated with a RAN cluster is configured based on one or both of: an aggregated data rate experienced or expected to be experienced by a RAN cluster, and per-device QoS requirements for devices serviced by the RAN cluster.

Once the VN has been configured, including the provision of logical tunnels and the configuration of v-routers, the VN is available to serve end points such as UEs and/or servers that initiate connection to the VN in a hop-on operation.

FIGS. 3A, 3B, 4A, 4B, 5A, 5B, 6A, 6B, and 7 illustrate VN configuration according to an example embodiment of the present invention. The VN is configured using the network resources illustrated in FIG. 1. FIGS. 3A, 3B, 4A, 4B, 5A, 5B, 6A, 6B, and 7 can be illustrative of a sequence of steps for defining the VN according to the example embodiment. That is, the VN description is generated in FIG. 3A, the v-router tunnel configuration is established in FIG. 4A, the VN routing table configuration is performed in FIG. 5A, the mapping between logical tunnels and physical network resources is performed in FIGS. 6A & 6B, and SDRA-Op is configured in FIG. 7. The figures are described in further detail below.

As will be seen in FIGS. 3A, 3B, 4A, 4B, 5A, 5B, 6A, 6B, and 7, embodiments of the present invention comprise providing a description of VN nodes, including their associations with physical network nodes. Embodiments further comprise providing a description of VN tunnels interconnecting VN nodes, and a QoS description of the VN tunnels. Embodiments further comprise associating v-routers with the VN nodes. Embodiments further comprise associating v-routers with VN tunnels and indicating, at each v-router, an egress VN node for each outgoing tunnel. Embodiments further comprise configuring v-router routing tables, including associating possible destination node IDs with outgoing VN tunnels to be used in forwarding packets toward such destination node IDs. Embodiments further comprise configuring network nodes to forward packets designating an ID of a particular tunnel (or destination network node ID) to a designated next network node, the designated next network node forming a next hop in a network path of the tunnel. Embodiments further comprise configuring network nodes to handle packets in accordance with a desired QoS level. Embodiments further comprise selecting whether one or more access nodes are to use dedicated and/or pre-assigned access link resources to transmit and/or receive packets according to the service, and/or selecting whether one or more access nodes are to perform service-based or device-based resource assignment. Embodiments further comprise identifying and configuring access links to use dedicated and/or pre-assigned access link resources and/or to perform service-based or device-based resource assignment.

Figure 3A:
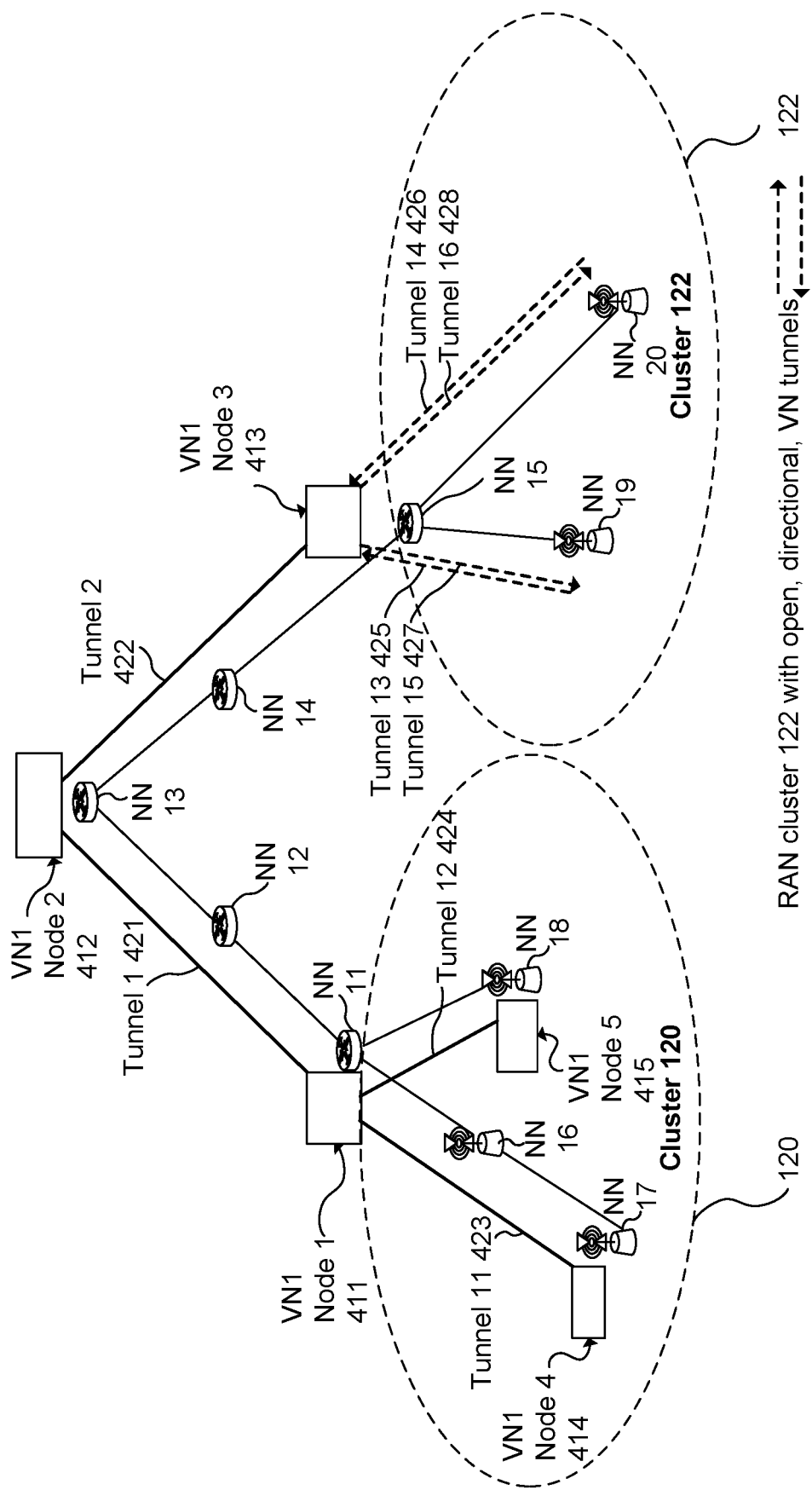

FIG. 3A illustrates a description of a VN having VN ID equal to one. This VN is referred to as VN1, to illustrate that multiple VNs may be supported. VN1 Nodes 1 to 5 411, 412, 413, 414, 415 are described as follows. VN1 Node 1 411 associates with NN 11 and cluster 11, VN1 Node 2 412 associates with NN 13 and may further be assigned a cluster ID of 10 to indicate that it is outside of both clusters 11 and 12, VN1 Node 2 413 associates with NN 15 and cluster 12, VN1 Node 4 414 associates with NN 17 (an access node) and cluster 11, and VN1 Node 5 415 associates with NN 18 (an access node) and cluster 11. The VN logical topology, including VN nodes and VN tunnels, is illustrated on top of the network infrastructure of physical network nodes and communication links.

Figure 5A:
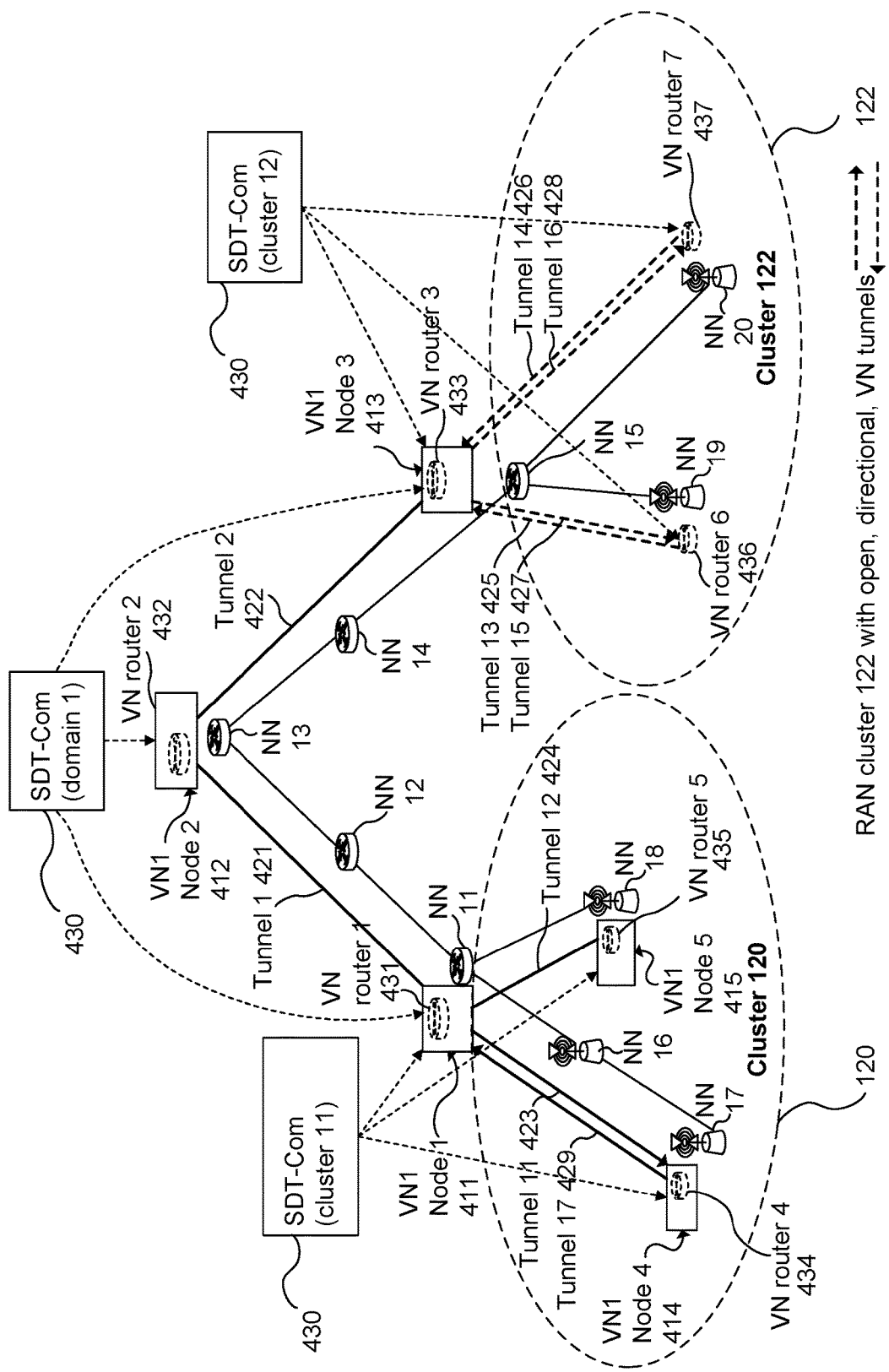

VN tunnels 421, 422, 423, 424, 425, 426, 427, 428 are also described as follows. Tunnel 1 421 has an ingress at VN1 Node 2 412 and an egress at VN1 Node 1 411, tunnel 2 422 has an ingress at VN1 Node 2 412 and an egress at VN1 Node 3 413, tunnel 11 423 has an ingress at VN1 Node 1 411 and an egress at VN1 Node 4 414, and tunnel 12 424 has an ingress at VN1 Node 1 411 and an egress at VN1 Node 5 415. Only one direction of (non-open) VN tunnels is illustrated, however tunnels for packet flow in the opposite direction may also be provided. For example, FIG. 5A illustrates tunnel 17 429 which has an ingress at VN1 Node 4 414 and an egress at VN1 node 1 411. Open tunnel 13 425 has an ingress at VN1 Node 2 413 and routes packets to a destination of NN 19, open tunnel 14 426 has an ingress at VN1 Node 3 413 and routes packets to a destination of NN 20, open tunnel 15 427 has NN 19 as its source and routes packets to a destination of VN1 Node 3 413 as egress, and open tunnel 16 428 has NN 20 as its source and routes packets to a destination of VN1 Node 3 413 as egress.

Referring to FIG. 3B, example tunnel, device, VN node, and open tunnel descriptions for VN1 are listed. VN1 device, tunnel, and open tunnel QoS descriptions are also provided. The device QoS description may include a data rate (e.g. 500 kbps) and a latency (e.g. 100 ms). The device QoS description may be global for all VN1 devices or the device QoS description may differ between devices. Each tunnel QoS description, and optionally the open tunnel QoS descriptions, may include at least a data rate.

Figure 4A:
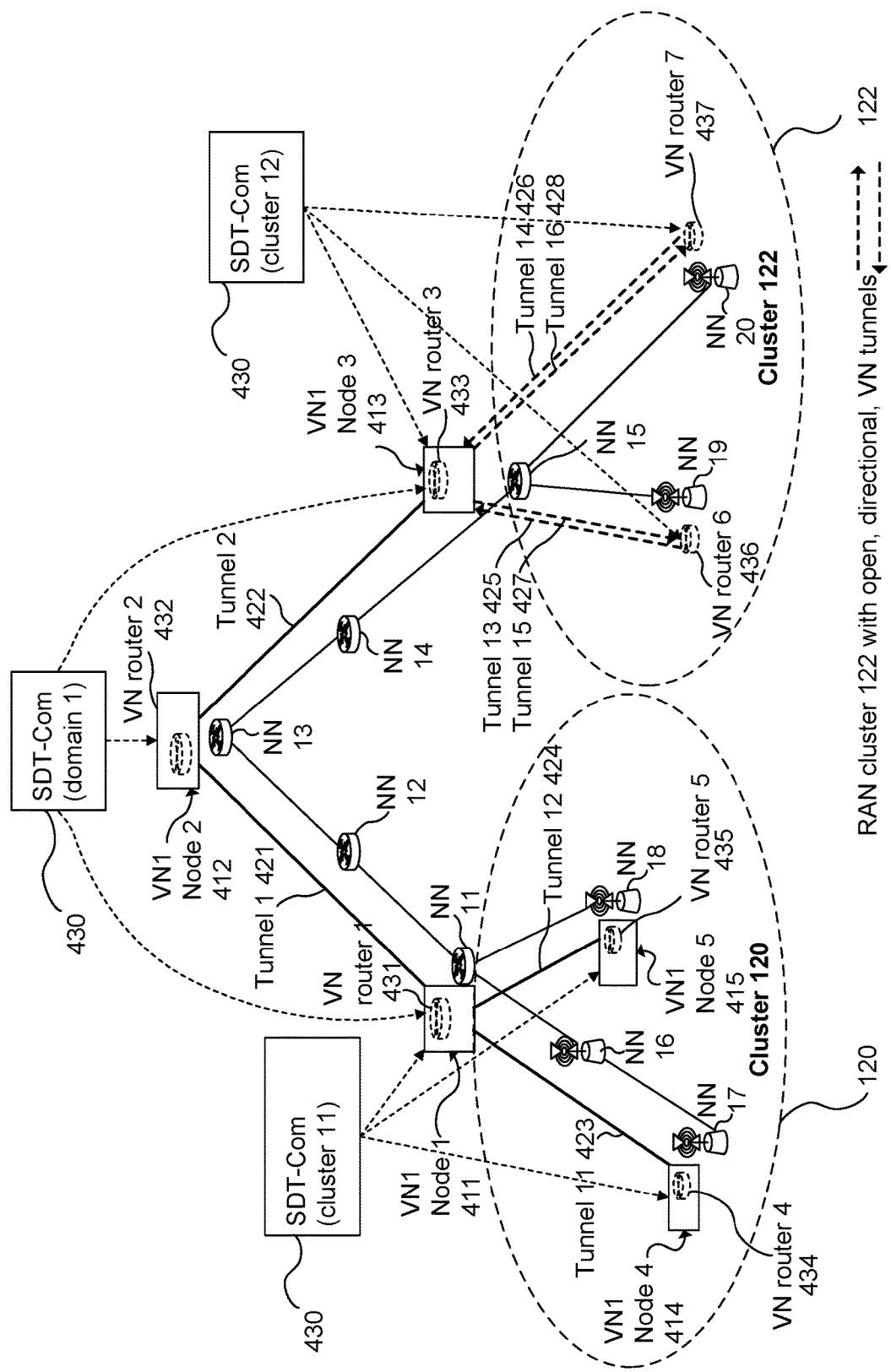
FIGS. 4A & 4B illustrate another aspect of configuration of the network of FIG. 1, including virtual network router and tunnel configuration.

FIG. 4A illustrates a tunnel configuration of v-routers associated with SDT-Op. The configuration may be performed by appropriate elements of SDT-Com 430, which are functionalities of SONAC. Depending upon the implementation, there may be a centralized SDT-Com 430, or there may be separate domain and cluster level SDT-Com 430 as illustrated in FIG. 4A. V-routers 431, 432, 433, 434, 435 and labelled as "VN router 1 to 5" are instantiated and associated with VN1 nodes 1 to 5 (411, 412, 413, 414, 415), respectively. V-routers 436 and 437 and labelled as "VN routers 6 and 7" are instantiated and associated with network nodes NN 19 and NN 20, respectively. The v-routers 431 to 437 are handled by SDT-Op, and therefore the instantiation of v-routers and their association with nodes corresponds to an association of VN1 with SDT-Op. The v-routers may be instantiated using cloud-based or datacenter-based resources, for example.

Figure 4B:
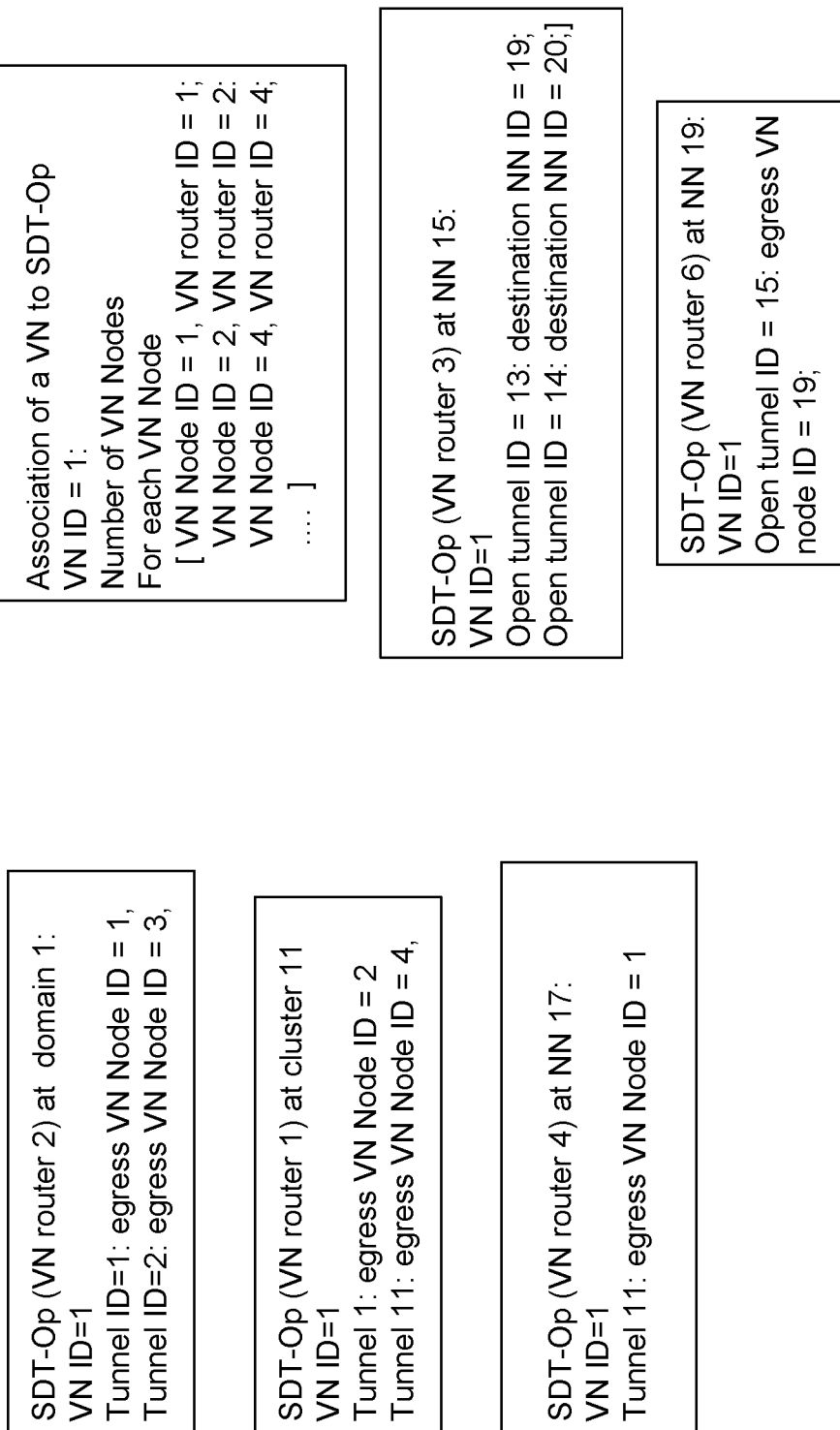

Referring to FIG. 4B, the v-routers and/or the v-router aspects of SDT-Op are associated with VN tunnels as follows. For each v-router, the tunnels which terminate at the VN node associated with that v-router are specified as part of the VN router definition held by SDT-Op, and the egress VN node or destination network node (in the case of an open tunnel) is also specified in this definition. For example, v-router 1 431 is associated with tunnel 1 421 and tunnel 11 423, the egress of tunnel 1 (i.e. VN1 Node 2 412) is specified to v-router 1 by way of an identifier number, and the egress of tunnel 11 (i.e. VN1 Node 4 414) is specified to v-router 1 431 by way of another identifier number. As another example, v-router 3 433 is associated with open tunnel 13 425 and open tunnel 14 426, and the destination network node IDs of open tunnels 13 and 14 (i.e. NN 19 and NN 20) are specified to v-router 3.

FIG. 5A illustrates the configuration of a VN routing table of v-routers as defined in FIGS. 4A & 4B. The configuration may also be performed by appropriate elements of SDT-Com 430. For each v-router, the routing table associates destination VN Node IDs with a VN tunnel to be used to reach that destination VN node. When a v-router receives a packet specifying a given destination VN node ID, the v-router submits the packet to the corresponding logical tunnel for forwarding toward that destination VN node. The routing table is populated so that all VN nodes reachable from the v-router are associated with at least one VN tunnel. For example, for VN1 v-router 432 labeled VN router 2, destination VN nodes 1, 4 and 5 411, 414, 415 are associated with tunnel 1 421 in the routing table and destination VN node 3 413 is associated with tunnel 2 422. FIG. 5B illustrates various v-router routing table information, including associations between destination VN node IDs and next tunnel IDs.

In this example, separate directional tunnels are provided to support VN router 4 434 at NN 4 414. In this example, tunnel 11 423 supports all VN1 traffic to VN router 4 434, and new tunnel 17 429 carries all VN1 traffic from VN router 4 434 to the next node, Node 1 411.

Figure 6A:
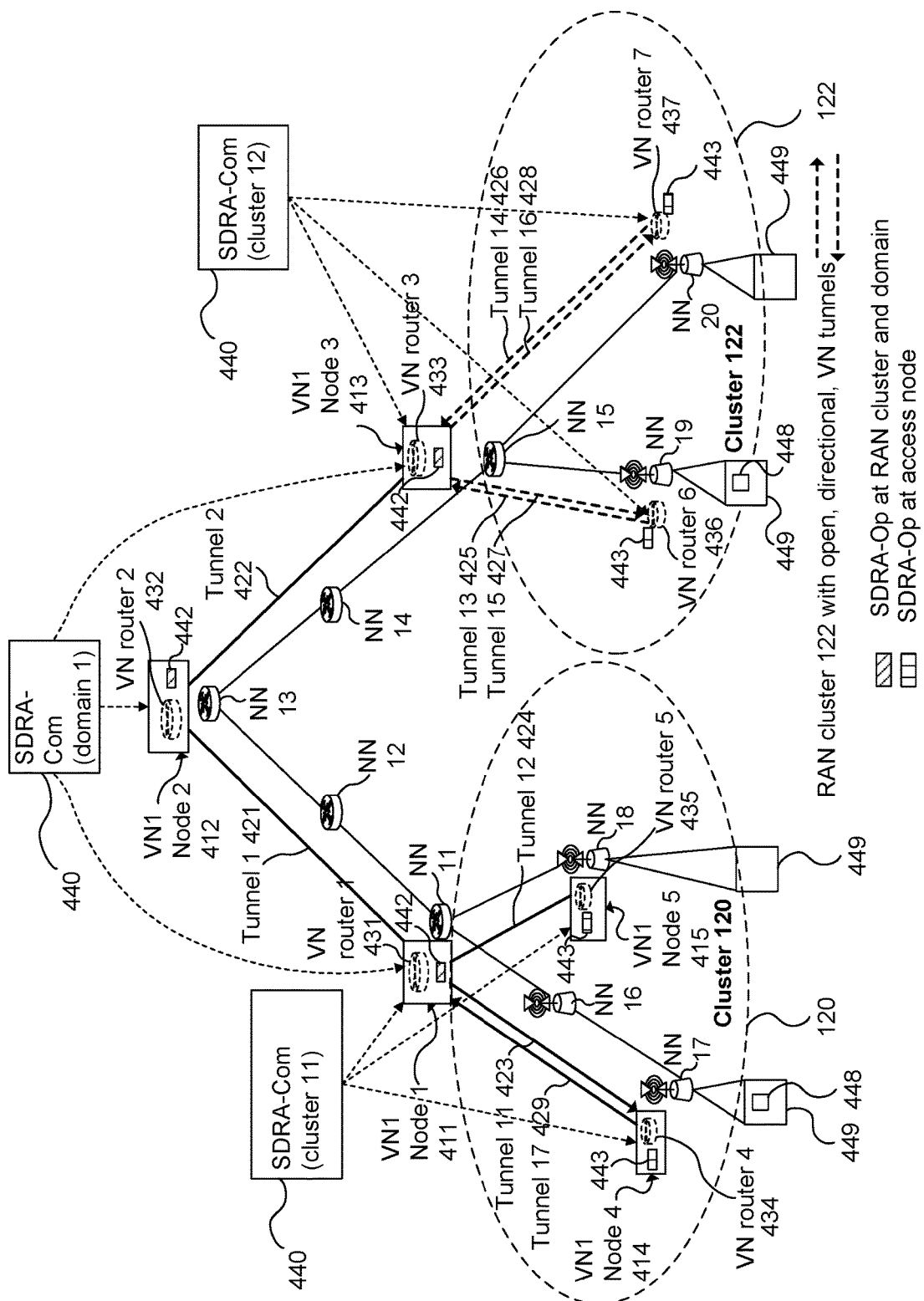
FIGS. 6A & 6B illustrate another aspect of configuration of the network of FIG. 1, including mapping between virtual network tunnels and physical network resources.

FIG. 6A illustrates a defined VN including mappings of logical tunnels to physical network resources. The mapping to physical resources may be performed by appropriate elements of SDRA-Com 440. As illustrated, SDRA-Com 440 configures elements of SDRA-Op (e.g. associated with v-routers) at the RAN cluster 442 and domain levels 443. SDRA-Com 440 may also configure physical network nodes which are not necessarily associated with a VN node (e.g. NN 16).

Figure 6B:
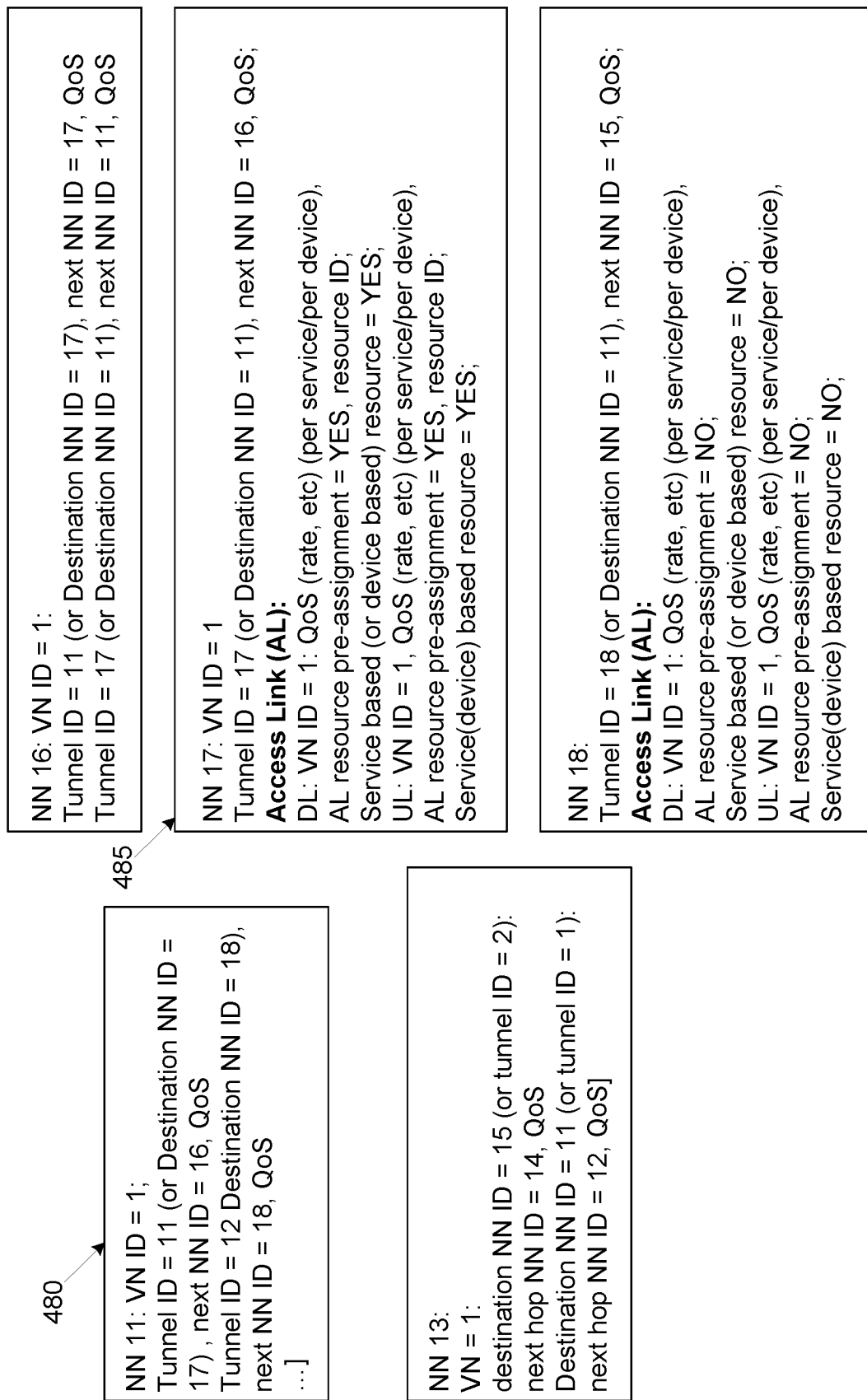

Referring to FIG. 6B, the configuration at this level includes specifying, for a given physical network node, and for a given VN tunnel supported by the given physical network node, an identity of at least one next physical network node (communicatively coupled to the given physical network node) which the given physical network node is to forward packets to in order to support communication via the VN tunnel. The VN tunnel may be specified by its identifier, or alternatively using a destination network node identifier at the tunnel end point (egress). As such, physical network nodes are provided with an indication of which next physical network node to forward packets to when such packets specify a particular VN tunnel passing through that physical network node. The configuration also specifies QoS parameters for each physical network node and VN tunnel.

For example, as illustrated in box 480 of FIG. 6B, at network node NN 11 and for VN ID number one, tunnel 11 423 and/or destination node NN 17 is associated with a next-hop network node ID of NN 16 and tunnel 12 424 and/or destination node NN 18 is associated with a next-hop network node ID of NN 18.

As also illustrated, SDRA-Com 440 configures elements 443 of SDRA-Op at the access node level. The configuration of access nodes also includes specifying associations between VN tunnels (and/or destination nodes) and next physical network nodes used to forward packets in order to support communication via the VN tunnel, as described above. The configuration of access nodes may further include specifying access link resources to use for communicating packets associated with the VN being configured. The specified access link resources may be dedicated to the VN. As such, an access node may be configured to use dedicated access link resources for scheduling and/or transmitting uplink, and/or downlink packets corresponding to a service supported by the VN. Both uplink and downlink access link resource assignments may be specified, either together or separately.

Specifying access link resources may include specifying QoS parameters such as data rates (or data rate guarantees) and whether QoS is allocated on a per-service or per-device level. Specifying access link resources may also include specifying whether or not access link resources are to be pre-assigned, and if so, a resource ID corresponding to the pre-assignment. Specifying access link resources may also include specifying whether or not service-based (or device-based) resource assignments are to be used. Other access link resource specifications may be made including waveform parameters for use in transmission, spectrum resources to be used and other such physical parameters of the access link. In the case of service-based resource assignment, broadcast transmission can be utilized for downlink traffic to reduce signaling overhead, compared to per-device-based access link resource management.

As an example, for NN 17 and VN1, and as illustrated in box 485 of FIG. 6B, access link resources may be specified as follows. For the downlink and uplink, pre-assignment of access link resources may be used, and an appropriate resource ID may be specified. Implementation of service-based or device-based resource allocation may also be specified.

In some embodiments, the above-described configuration of access nodes may cause the access nodes to utilize certain specific sets of time, frequency and/or spreading code resources to wirelessly communicate packets to end points, when such packets are associated with a service supported by the configured VN. Having reference to FIG. 6A, these resources 448 may be a subset of all available resources 449.

Figure 7:
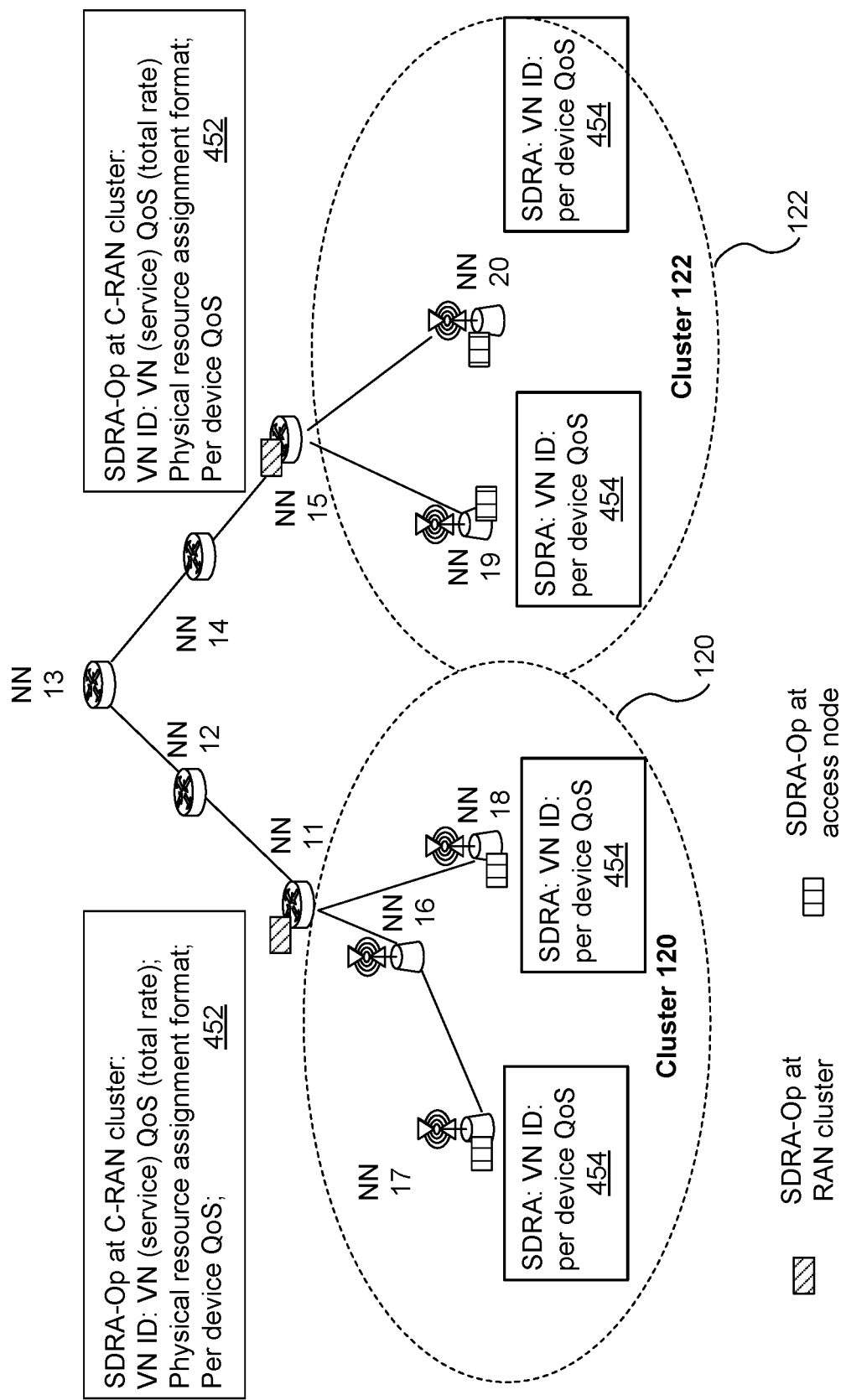
FIG. 7 illustrates another aspect of configuration of the network of FIG. 1, including configuration of a resource allocation management function.

FIG. 7 illustrates a defined VN including configuration details of SDRA-Op. In particular, SDRA-Op is configured (e.g. by SDRA-Com) at the RAN cluster level to specify 452, for each VN (designated by a VN ID such as VN1), one or more of: a supported service, QoS parameters such as a total data rate, a physical resource assignment format, and per-device QoS parameters. At the access node level, SDRA-Op is configured to specify 454 per-device QoS parameters for each VN.

As stated above, various embodiments of the present invention provided for the configuring of edge nodes of the network to monitor for a packet which is associated with a service (e.g. by inclusion of a service-related ID), and to submit the packet to the VN for handling thereby. The configuration may include, for example, configuring a function which associates with an edge node and which monitors headers and/or payloads of packets received by the edge node from end points. The function may be implemented at the edge node or remotely from the edge node, for example using cloud-based or datacenter resources. Configuration of the edge node may be performed by configuring a VN node which is associated with (e.g. logically co-located with) the edge node.

In some embodiments, edge nodes are provided, during pre-configuration, with one or more service-related identifiers IDs, and configured to monitor packets for occurrence of such identifiers. The identifier or identifier being monitored for is associated with a service supported by the VN. Each edge node may also be configured to submit such packets to a designated VN node, which may be associated with the edge node or communicatively linked to the edge node, for example via an open tunnel.

In some embodiments, edge nodes are configured to recognize service related IDs, such as name identifiers, VN IDs and/or service IDs, and to configure the packet for handling by the appropriate VN prior to submission thereto. The configuration of the packet may include inserting header information or encapsulating the packet, for example. In one embodiment, the received packet includes a unique name identifier as the service-related identifier, and the edge node looks up the VN used to reach the node having the name identifier, and then inserts the VN ID of this VN into the packet.

In some embodiments, edge nodes, such as radio access nodes, are configured to use dedicated access link resources for transmitting and/or receiving packets corresponding to the service, the packets transmitted toward and received from the end point. Access link resources may include time slots, frequency bands, and/or spreading codes used for wireless multi-access communication. Use of such dedicated access link resources may include one or more of: transmitting using the resources, monitoring for reception of packets transmitted using the resources, specifying in a transmission scheduling request that the resources are to be used, and scheduling transmission according to the resources. In other embodiments, edge nodes are configured to use shared access link resources for transmitting and/or receiving packets corresponding to the service. The configuration of edge nodes to use dedicated or shared access link resources may be performed by SDRA-Com.

In some embodiments, rather than or in addition to forwarding packets to the VN based on a service-related identifier contained therein, an edge node may be configured to forward packets to the VN based at least in part on the access link resources used to transmit the packet to the edge node. For example, when an end point uses certain dedicated access link resources to transmit packets according to the service, the edge node may automatically determine that a packet belongs to the service when it is transmitted using such dedicated resources, and accordingly forward the packet toward the VN associated with the service.

In some embodiments, pre-configuration includes specifying different access link resources (e.g. time, frequency and/or spreading code resources) to be used by end points for accessing different services. End points then use the access link resources assigned to the desired service. In other cases, end points request access to a specified service over a channel used for that purpose, and access nodes (or schedulers) respond by indicating the appropriate access link resources to use.

Embodiments of the present invention comprise pre-configuring the edge nodes and/or VN to perform admission control prior to allowing an end point to transmit and receive data packets of the service via the VN. Admission control may be used on a case-by-case basis, and may be omitted in some embodiments. According to admission control, when an end point requires use of a service (e.g. to download or stream data, or to begin a communication session with another end point), an admission control procedure is performed in an attempt to obtain authorization for the end point to use the service. Admission control may be used for example when authentication of end points is required, or when delivery of the service requires significant resource usage, and a determination of whether sufficient resources are available is to be made prior to service delivery. Admission control may be required, for example, when the service involves bulk data transmission over a VN with limited capacity.

The admission control operation according to some embodiments is as follows. Before an end point such as a UE connects to the VN, the end point transmits a service request to an admission control entity supervising the VN. The admission control entity determines whether to allow the end point to use the service and, if so, transmits an authorization to the end point. The authorization may further be provided (by either the admission control entity or the end point) to an edge node, VN node or v-router to inform same of the authorization. In some embodiments, the edge node transmits the service request on behalf of the end point. The admission control entity, edge node, VN node and/or v-router are configured to carry out this admission control procedure. The admission control entity may be instantiated using cloud resources as part of the pre-configuration, and may be associated with one or multiple edge nodes, for example.

End points may register to the VN to indicate a present or future requirement to access to the service. Upon or after the registration operation, the end point receives a service-related identifier which is usable in packets to specify that such packets are to be treated by the VN and service. The end point may further receive a radio ID (similar to a MAC ID in 3G and 4G wireless networks) which is usable in access link resource assignment procedures. After registration, an end point may be associated with a VN Node. When an end point is associated with a VN Node, this VN node becomes an anchor point of the end point in the VN. Packets destined for the end point may be routed to the anchor point via the VN tunnels and then transmitted from the anchor point to the end point. The anchor point may change due to end point mobility. The association of an end point to a VN Node may be determined based on the end point's MAC state, mobility velocity, and other network requirements.

This association between an end point and a VN node can be viewed as logical tunnel between the end point and the VN Node.

Figure 8A:
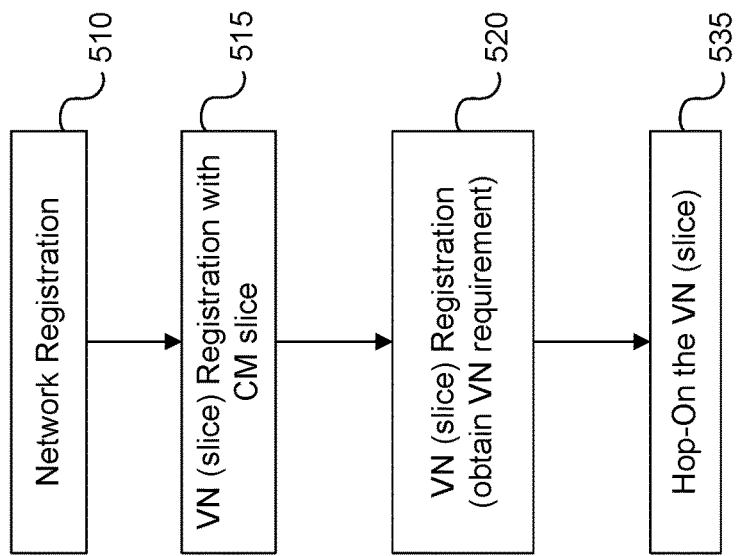
FIGS. 8A, 8B, & 8C illustrate registration and communication operations performed according to various embodiments of the present invention.
Figure 8B:
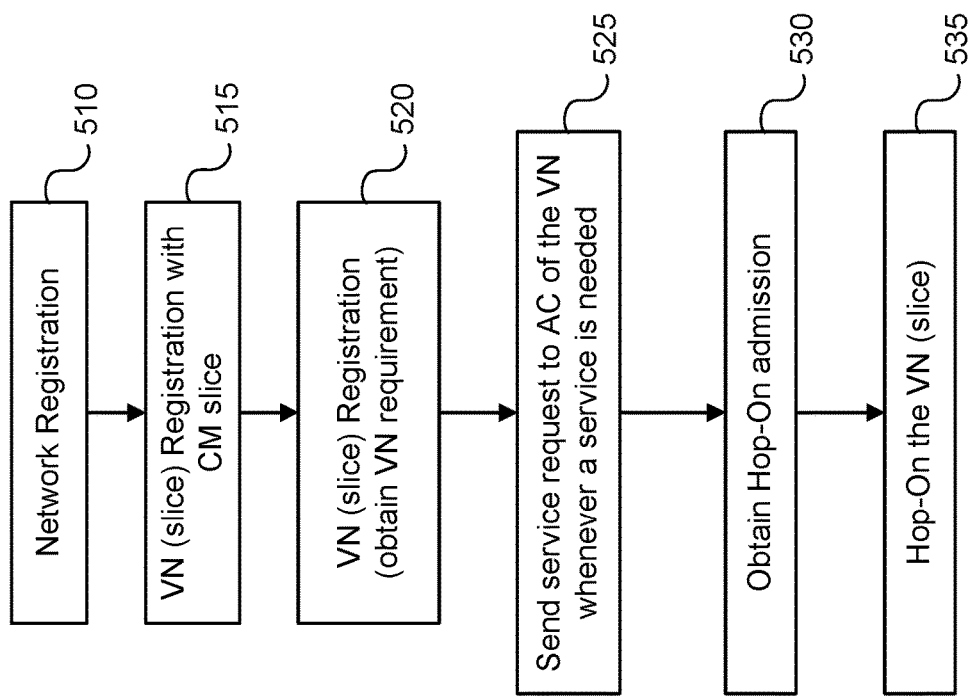
Figure 8C:
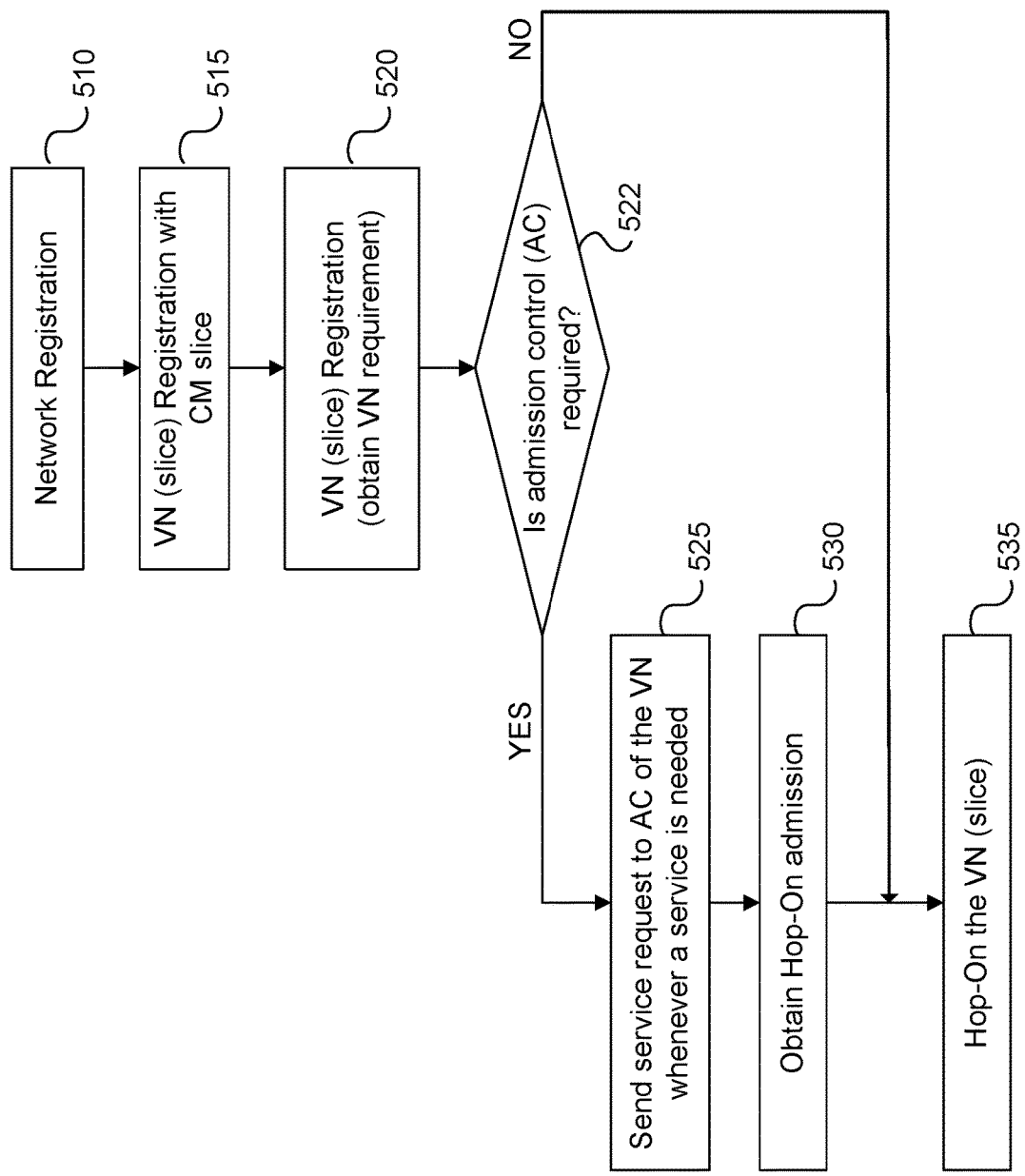

FIGS. 8A, 8B, & 8C illustrate optional procedures to be followed when an end point attempts to use a service supported by the VN. Network registration 510 is performed in which the end point obtains authentication and authorization to connect to the network. Next, registration to a connection management entity (CM) 515 is performed, in which a reachability operation is initiated. The reachability operation includes tracking, by the network, the location of the end point. Tracking may be initiated even before registering with a user plane (UP) VN or network slice. Next, the end point is registered 520 to a VN. VN requirements may be obtained at this point. Referring to FIG. 8A, if no admission control is required, the end point can begin transmitting data (or otherwise accessing the service), thereby "hopping on" 535 to the VN. Referring to FIG. 8B, if admission control is required, an admission control AC procedure is performed. According to the admission control procedure, whenever an end point requires use of the service (e.g. to download a file with a given data rate), a service request is transmitted 525 to an admission control entity, and an admission is obtained 530, for example in the form of an authorization message. The end point then begins transmitting data or otherwise accessing the service, thereby hopping on the VN 535. Referring to FIG. 8C, in an optional procedure the VN may be further operative to selectively apply admission control based upon a protocol established during the pre-configuration phase. In the optional procedure, when the end point is registered 520 to the VN, a determination is made at step 522 to determine whether admission control is required for this end point to access the requested service. Depending upon the outcome of the determination 522, the procedures described with reference to FIGS. 8A and 8B may be selected.

Various embodiments of the present invention include configuring protocols to be used by VN nodes, edge nodes, end points, services and/or applications. SDP-Com may be used to configure protocols used in the network slice, while SDP-Op may be used to support protocol selection for a device and/or application, for a selected tunnel given by SDT-Op. SDP may be used to manage end-point protocol configuration and tunnel protocol configuration. SDP-Com may configure some or all of: end-to-end protocols used between end points such as UEs and servers, per-tunnel protocols for non-RAN cluster tunnels, RAN cluster tunnel protocols, and link protocols used in RAN clusters, e.g. in association with tunnels or open tunnels. Further, SDP-Com is used to configure SDP-Op. For example, SDP-Com may configure, in SDP-Op, rules regarding per-device packet transmission protocols to use without violating service-level protocol configurations.

Embodiments provide for an apparatus for configuring a network to support delivery of a service to an end point associated with the service. Having reference to FIG. 9, the apparatus 600, which may be SONAC or components thereof, generally includes a computer processing element(s) 610, memory 620 and a communication interface 630 such as a network interface. However, it should be understood that the apparatus may be provided using network function virtualization, and therefore components thereof may be located in a cloud, datacenter, and/or distributed through the network. Further, it should be understood that the apparatus may be distributed through the network and/or across multiple cloud or datacenter locations. As such, the apparatus may include multiple computer processors, computer memory components and communication interfaces, which cooperate together.

Figure 9:
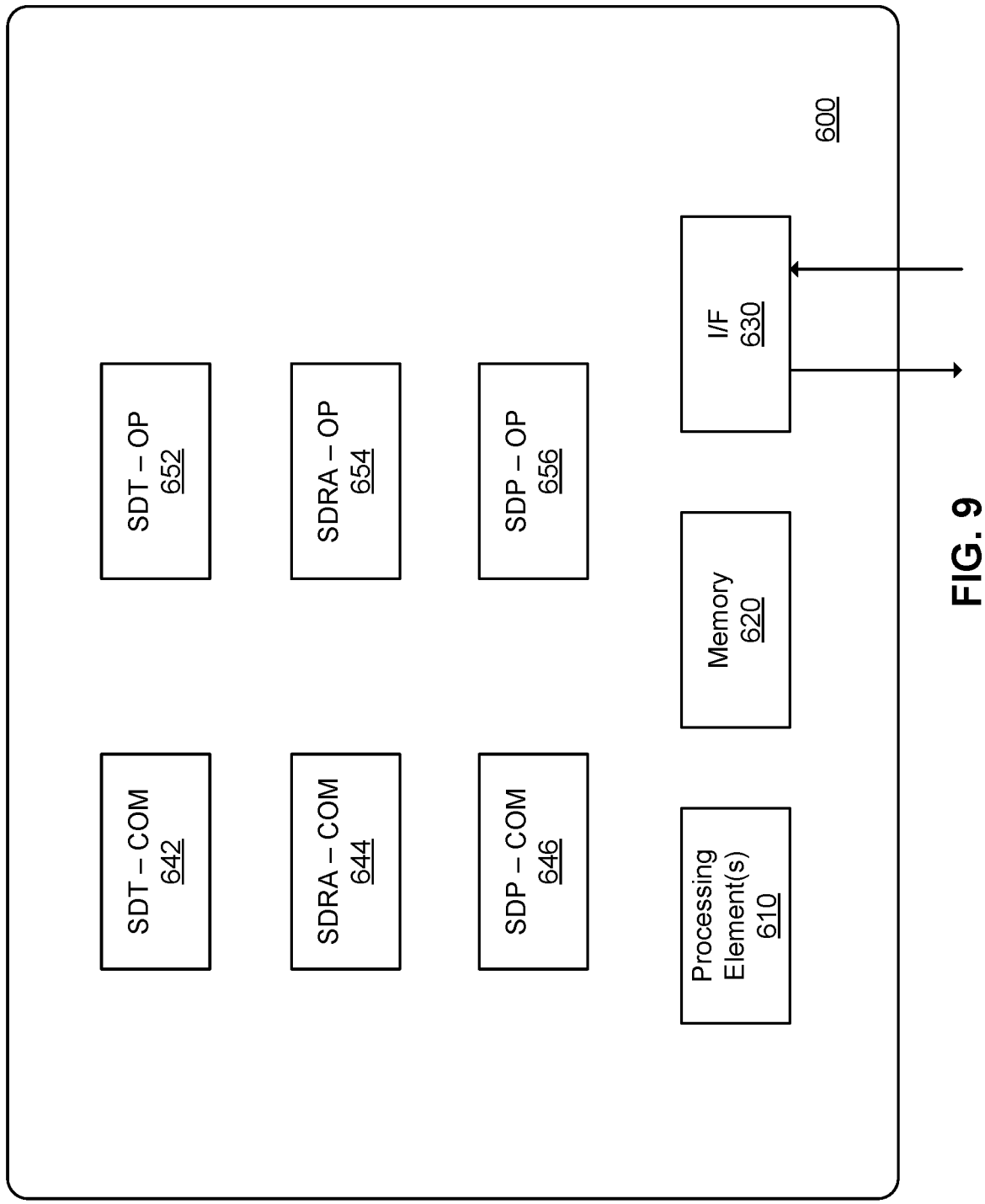
FIG. 9 illustrates an apparatus for configuring a communication network, according to an embodiment of the present invention.

FIG. 9 further illustrates various components of the SONAC 600, including SDT-Com 642, SDRA-Com 644 SDP-Com 646, SDT-Op 652, SDRA-Op 654, and SDP-Op 656. Different components may be located at different distributed portions of the apparatus, and are generally realized by operation of the processing elements 610, memory components 620 and communication interface 630.

In various embodiments, the apparatus configures the network by transmitting messages to underlying resources, such as network nodes, edge nodes, and cloud or datacenter nodes. The messages are transmitted by the communication interface 630, which may also receive messages from the underlying resources. The processor 610 in conjunction with the memory 620 may execute computer program instructions which generate the messages, include appropriate directions therein, and to interact with the underlying resources to cause the network to be appropriately configured.

In some embodiments, the SONAC 600 associates with multiple network nodes and has resources, such as processing and memory resources, located in the network cloud.

Figure 10:
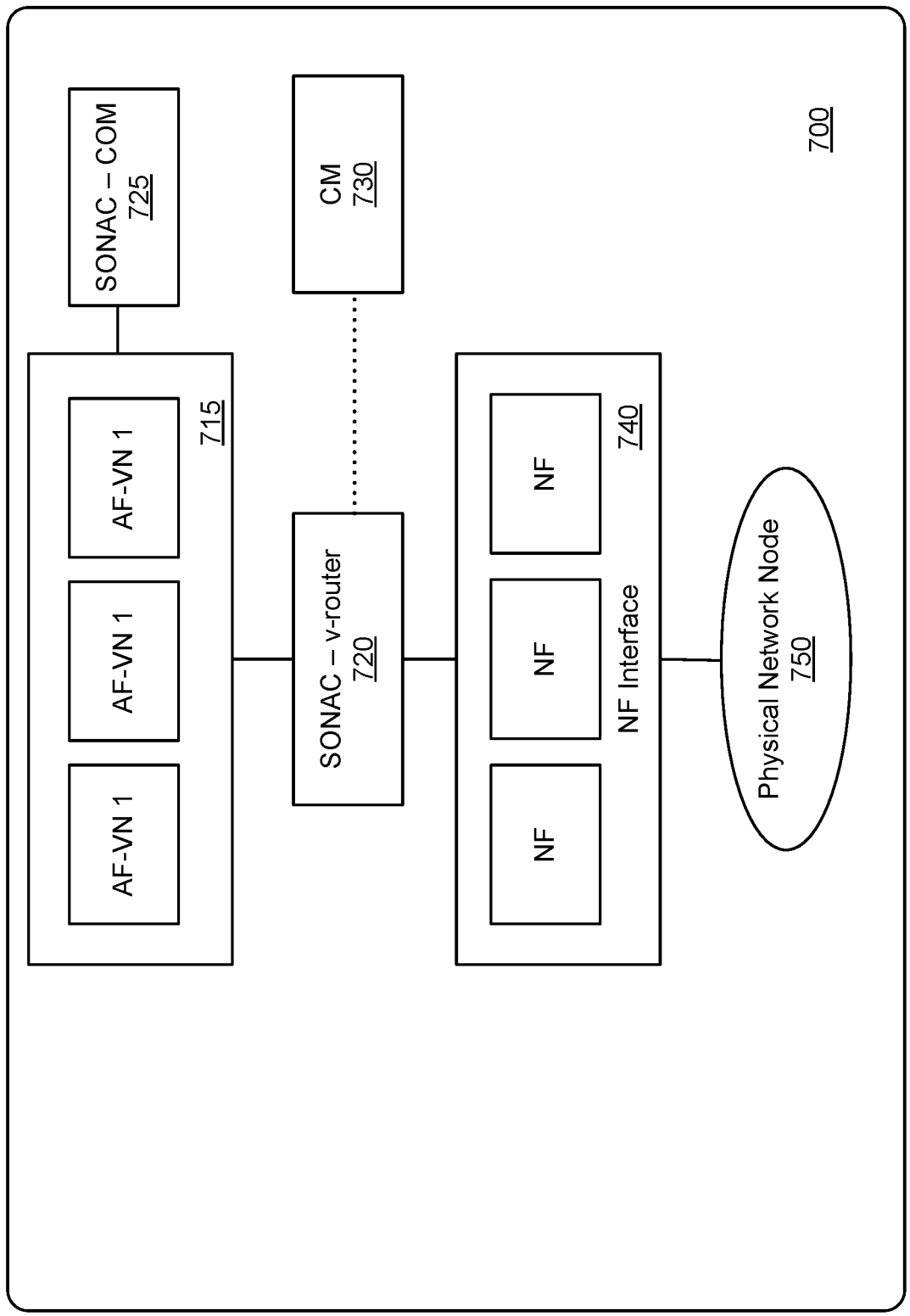
FIG. 10 illustrates an apparatus associated with a virtual network (VN) node, according to an embodiment of the present invention.

FIG. 10 illustrates an apparatus 700 associated with a VN node, according to an embodiment of the present invention, which may also be regarded as a functionality of SONAC, along with interfaces thereof. The apparatus includes a v-router 720, which may be regarded as or managed by a SONAC-Op component. The v-router 720 may be configured by SONAC-Com 725, which is illustrated as a separate component for clarity. The v-router 720 may also communicate with a connection management (CM) entity 730, in order to receive obtain current location information of end points for use in updating routing tables of the v-router. The v-router and/or SONAC-Op may also interface with one or more application functions (AF) 715 which may be used to facilitate service delivery, for example by performing in-network processing. The v-router 720 is also associated with a physical network node 750, such as a router or switch.

The v-router 720 can be VN specific. Alternatively, the v-router can be shared by multiple VNs and/or services, in which case network function interfaces 740 with multiple VNs may be provided. A VN node may support one or multiple network functions of a service and/or VN.

Figure 11:
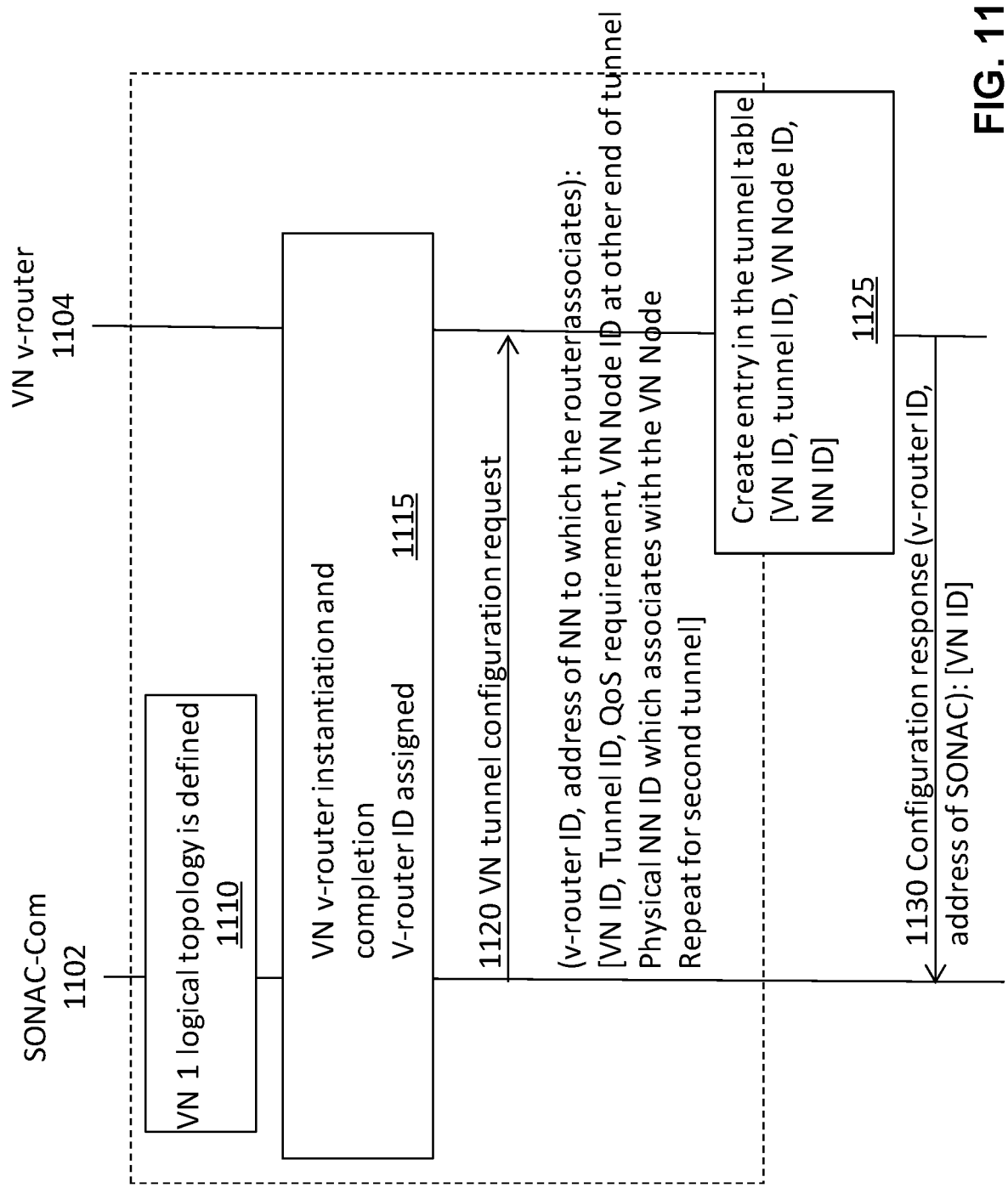
FIG. 11 is a signaling diagram outlining the steps for configuration of a v-router, using a tunnel configuration, according to one embodiment of the present invention.

FIG. 11 is a signaling diagram outlining the steps for configuration of a v-router, using a tunnel configuration, according to one embodiment of the present invention. This configuration procedure can be repeated at the same v-router for a second VN if a v-router supports multiple VNs. In more detail, SONAC-Com 1102 defines 1110 the logical topology of a VN being configured, such as VN 1. SONAC-Com 1102 then instantiates 1115 the v-router 1104, possibly along with other v-routers, and assigns a v-router ID to the v-router 1104. SONAC-Com 1102 then transmits a VN tunnel configuration request 1120 to the v-router 1104. The tunnel configuration request specifies various configuration information items required for configuring the v-router to utilize a logical VN tunnel. As illustrated, such information includes the v-router ID, address of the associated network node, VN ID, tunnel ID, QoS requirements parameters for the tunnel, the VN node ID at the other end of the tunnel, and the physical network node ID associated with this VN node. The tunnel configuration request may specify configuration information items for multiple logical tunnels. The v-router 1104 then creates 1125 an entry in its tunnel configuration table associated with the subject tunnel of the configuration request. As illustrated, the entry may contain information such as the VN ID, tunnel ID, VN node ID at the other end of the tunnel, and network node ID associated with this VN node. Multiple entries can be created for multiple tunnels. The v-router 1104 then transmits a configuration response 1130 to SONAC-Com 1102, indicative that the tunnel has been configured at the v-router. As illustrated, the configuration response can identify the v-router ID, the address of the SONAC-Com, and the VN ID specified in the request 1120.

Figure 12:
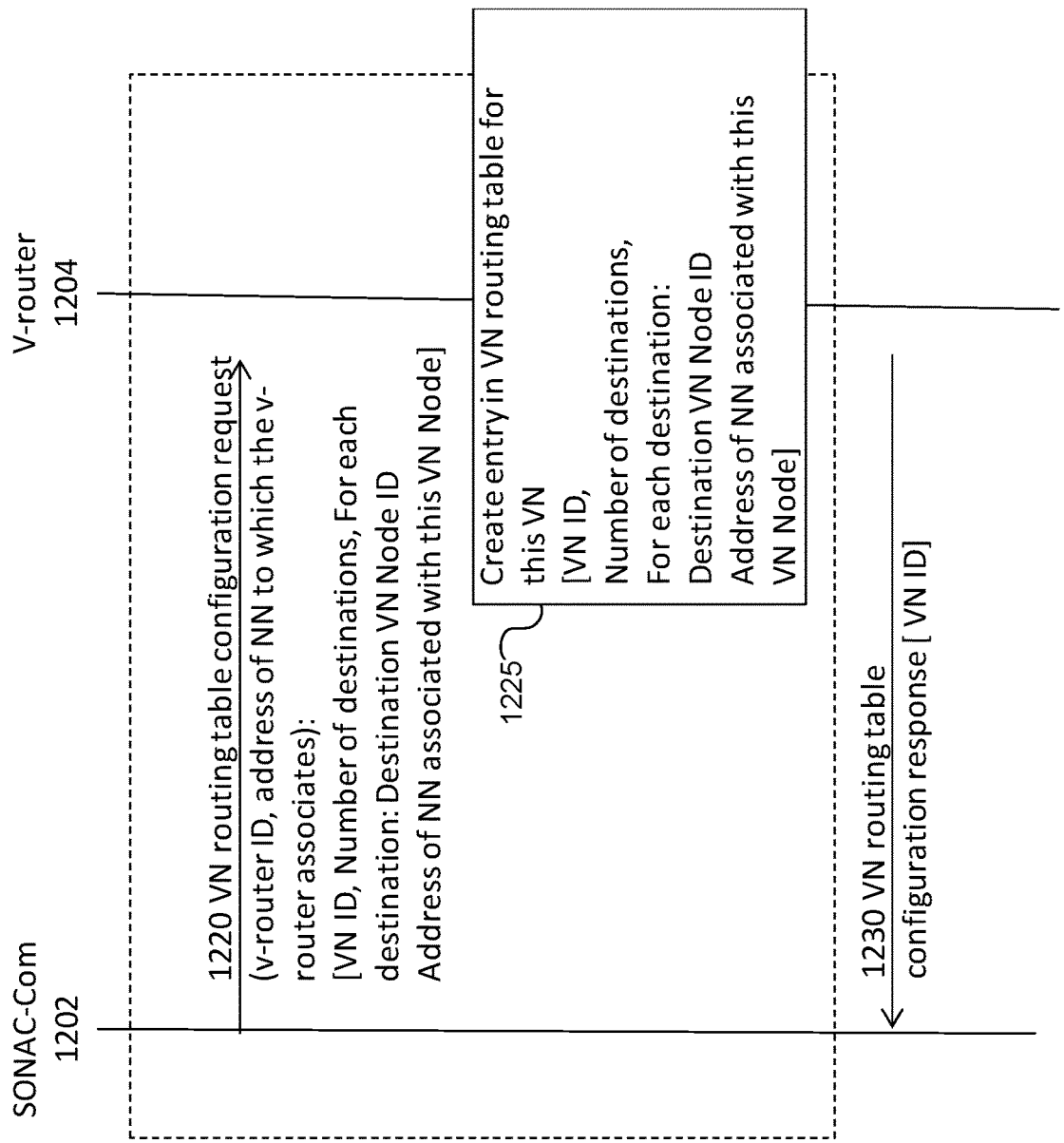
FIG. 12 is a signaling diagram outlining the steps for configuration of a v-router, for destination based VN routing, according to one embodiment of the present invention.

FIG. 12 is a signaling diagram outlining the steps for configuration of a v-router, for destination based VN routing, according to one embodiment of the present invention. This configuration procedure can be repeated at the same v-router for a second VN if a v-router supports multiple VNs. Although not illustrated, SONAC-Com 1202 may define the logical topology of a VN being configured, such as VN 1 and instantiate the v-router 1204, possibly along with other v-routers, and assign a v-router ID to the v-router. SONAC-Com 1202 transmits a VN routing table configuration request 1220 to the v-router 1204. The VN routing table configuration request specifies various configuration information items required for configuring the v-router. As illustrated, such information includes the v-router ID and address of the associated network node, and also includes particular configuration information including the VN ID, number of destinations being configured for the v-router, and, for each destination, the destination VN node ID and the address of the network node associated with this VN node. The v-router 1204 then creates 1225 one or more entries in its VN routing table associated with the subjects of the configuration request. As illustrated, the entries may contain information such as the VN ID, number of destinations being configured for the v-router, and, for each destination, the destination VN node ID and the address of the network node associated with this VN node tunnel ID. The v-router 1204 then transmits a configuration response 1230 to SONAC-Com 1202, indicative that the VN routing table has been configured at the v-router. As illustrated, the configuration response can identify the at least the VN ID specified in the request 1220.

As such, v-routers may be configured to forward packets explicitly via logical tunnels, or directly via underlying network nodes without requiring explicit treatment of logical tunnels. However, in the latter case, and in some embodiments, one may view the logical tunnels as being implicitly present.

In some embodiments, as part of the VN instantiation, the logical and physical topology of the VN is defined and realized. This involves instantiating VN nodes using available computing and memory resources, and associating the VN nodes with selected physical network nodes. The communication links between the VN nodes may also be partially or fully defined. In other embodiments, the VN topology may be pre-defined and/or pre-realized.

In various embodiments, resources are allocated to the VN based on estimated requirements thereof. For example, communication channel bandwidth between nodes of the VN can be allocated based on an estimate of data traffic to be handled by the VN between such nodes. As another example, computing and/or memory resources at a VN node can be allocated based on an estimate of demand for same in order to support service functions, data caching, and the like, in support of the service being provided by the VN.

In various embodiments, the VN may be pre-configured to perform or allow for in-network processing or other functions in support of operation of the VN or the service. For example, functions instantiated at one or more VN nodes may further include one or more of: packet aggregation functions, packet de-aggregation functions, firewall functions, anchor point functions, caching functions for storing downlink data; storage functions for storing uplink data; and in-network processing functions for implementing part or all of the service. The service may thereby be performed at least in part by the VN itself. The location of such service functions may be selected so as to optimize delivery of the service, for example by providing adequately low-latency and high QoS for the service delivery with an adequately small footprint on the network and/or supporting in-network, cloud-based and datacenter resources. When in-network processing of packets is required, v-routers may be configured to route packets to nodes supporting processing functions, in order, according to a service function chain. The location of the processing functions and the corresponding v-router routing table entries may be established as part of pre-configuration.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more processors operatively coupled to a corresponding set of memory components which include stored program instructions for execution by the processors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for configuring a network of physical network nodes to support delivery of a service to an end point accessing the network, the method comprising:
   configuring a virtual network (VN) on the network by:
     configuring a plurality of VN nodes to define the VN, each VN node of the plurality of VN nodes associated with a respective one of the physical network nodes;
     configuring logical tunnels to communicatively interconnect the VN nodes;
     instantiating VN virtual routers (v-routers) for routing packets between the VN nodes via the logical tunnels, each v-router of the instantiated v-routers associated with a corresponding one of the VN nodes and operative to receive a data packet addressed to the VN and intended for a destination end point, and to direct the received data packet through a configured interconnecting logical tunnel that connects the VN node of that v-router to a next VN node on a virtual path between that v-router and the destination end point; and
     determining Quality of Service (QoS) parameters for one of the logical tunnels based on an estimate of a number of end points which will be serviced by said one of the logical tunnels and an estimated integrated rate requirement for said one of the logical tunnels which is based on per-end point traffic requirements.

2. The method of claim 1, wherein configuring the VN further comprises:
   associating each v-router of the instantiated v-routers with a set of the logical tunnels, the set of the logical tunnels having an ingress at the one of the VN nodes corresponding with the v-router associated with the set of the logical tunnels; and,
   indicating, at each v-router of the instantiated v-routers, a corresponding egress node for each logical tunnel of the set of logical tunnels.

3. The method of claim 2, wherein configuring the VN further comprises:
   configuring, for each v-router of the instantiated v-routers, a routing table associating, for said each logical tunnel of the set of logical tunnels, a destination VN node identifier corresponding to a VN node located at the egress node indicated for said each logical tunnel of the set of logical tunnels.

4. The method of claim 3, wherein configuring the VN further comprises:
   associating at least one of the v-routers with a connection management entity; and,
   configuring said at least one of the v-routers to adjust the routing table based on messages indicative of locations of mobile end points to be received from the connection management entity during VN operation.

5. The method of claim 1, further comprising:
   configuring the physical network nodes to forward packets designating one of the logical tunnels toward a next physical network node associated with the designated logical tunnel, the next physical network node forming a next hop in a network path of the designated logical tunnel.

6. The method of claim 1, wherein configuring the VN further comprises determining a mapping between a particular one of the logical tunnels and underlying physical network resources used for conveying packets via said particular one of the logical tunnels.

7. The method of claim 1, further comprising configuring a resource allocation network operation function to assign physical network resources to support one or both of: operation of the VN nodes; and communication with edge nodes, said physical network resources assigned based on the determined QoS parameters.

8. The method of claim 1, wherein configuring the VN further comprises, for at least one logical tunnels, configuring each of a plurality of physical network nodes to forward received packets associated with said at least one logical tunnel to a specified next one of the plurality of physical network nodes.

9. The method of claim 1, wherein configuring the VN further comprises instantiating one or more functions at one or more of the VN nodes, the functions including or more of: a packet aggregation function; a packet de-aggregation function; a firewall function; and an anchor point function.

10. The method of claim 1, wherein for each physical network node that is associated with a logical tunnel ingress but is not associated with a VN node, the method further comprises:
    assigning a destination VN Node ID corresponding to a connected VN Node connected to an opposing logical tunnel egress;

assigning a service ID corresponding to the configured interconnecting logical tunnel; and configuring that physical network node to inspect received data packets for the service ID, and to direct the received data packets to the logical tunnel ingress for delivery to the connected VN Node that corresponds with the destination VN Node ID.

11. The method of claim 1, wherein the configuring further comprises:

setting a QoS for the inspection, direction, and delivery of the received data packets.

12. The method of claim 11, wherein the QoS comprises a measure of at least one of: a total throughput, and a latency of the logical tunnel.

13. An apparatus for configuring a communication network to support delivery of a service to an end point associated with the service, the apparatus comprising a processor, a memory and a communication interface and configured, prior to receipt of a request for access to the service by the end point to:

provide instructions to underlying resources to configure a virtual network (VN) having a plurality of VN nodes associated with a respective plurality of physical network nodes of the communication network, the configuring including:

providing logical tunnels communicatively interconnecting the plurality of VN nodes; and instantiating VN virtual routers (v-routers) associated with the plurality of VN nodes, wherein the v-routers are configured to route packets between the plurality of VN nodes via the logical tunnels;

determining Quality of Service (QoS) parameters for one of the logical tunnels based on an estimate of a number of end points which will be serviced by said one of the logical tunnels and an estimated integrated rate requirement for said one of the logical tunnels based on per-end point traffic requirements; and providing instructions to the underlying resources to configure one or more edge nodes of the communication network to monitor for a packet associated with the service, and to submit the packet to the VN for handling thereby, the one or more edge nodes being configured to communicate with the end point using a dedicated radio access link in accordance with the QoS parameters.

14. The apparatus of claim 13, wherein configuring the VN further comprises, for a first v-router associated with a first VN node: associating the first v-router with a set of the logical tunnels which have an ingress at the first VN node; and indicating, at the first v-router, an egress node of each of the set of logical tunnels.

15. The apparatus of claim 13, wherein configuring the VN further comprises configuring routing tables of the v-routers, the routing tables associating destination node identifiers with next logical tunnels to be used for routing packets containing said destination node identifiers using the next logical tunnels.

16. The apparatus of claim 15, wherein configuring the VN further comprises:

associating at least one of the v-routers to a connection management entity; and preparing said at least one of the v-routers to adjust messages based on the routing tables to be received from the connection management entity during VN operation, the messages to be indicative of locations of mobile end points during said VN operation.

17. The apparatus of claim 13, wherein the apparatus is further configured to provide instructions to the underlying resources to configure physical network nodes of the communication network to forward packets designating one of the logical tunnels toward a next network node associated with the designated logical tunnel, the next network node forming a next hop in a network path of the designated logical tunnel.

18. The apparatus of claim 13, wherein configuring the VN further comprises determining a mapping between a particular one of the logical tunnels and underlying physical network resources used for conveying packets via said particular one of the logical tunnels.

19. The apparatus of claim 18, wherein the mapping is determined at least in part according to QoS requirements of one or both of the VN and the logical tunnel.

20. The apparatus of claim 19, further comprising configuring a resource allocation network operation function to assign physical network resources to support one or both of: operation of the VN nodes; and communication with the edge nodes, said physical network resources assigned based on the QoS requirements.

21. The apparatus of claim 13, wherein configuring the VN further comprises, for at least one logical tunnels, configuring each of a plurality of physical network nodes to forward received packets associated with said at least one logical tunnel to a specified next one of the plurality of physical network nodes.

22. The apparatus of claim 13, wherein configuring the VN further comprises instantiating one or more functions at one or more of the VN nodes, the functions including or more of: a packet aggregation function; a packet de-aggregation function; a firewall function; and an anchor point function.

23. A system comprising:

a network function configured to configure a virtual network (VN) by:

configuring a plurality of VN nodes to define the VN, each VN node of the plurality of VN nodes associated with a respective one of the physical network nodes;

configuring logical tunnels to communicatively interconnect the plurality of VN nodes;

instantiating VN virtual routers (v-routers) for routing packets between the plurality of VN nodes via the logical tunnels, each v-router of the instantiated v-routers associated with a corresponding one of the plurality of VN nodes and operative to receive a data packet addressed to the VN and intended for a destination end point, and to direct the received data packet through a configured interconnecting logical tunnel that connects the VN node of that v-router to a next VN node on a virtual path between that v-router and the destination end point; and determining Quality of Service (QoS) parameters for one of the logical tunnels based on an estimate of a number of end points which will be serviced by said one of the logical tunnels and an estimated integrated rate requirement for said one of the logical tunnels which is based on per-end point traffic requirements; and one or more destination end points, each of the one or more destination end points being configured to issue a request for access to service by one or more of the logical tunnels.

24. The system of claim 23, the VN configured to:

associate each v-router of the instantiated v-routers with a set of the logical tunnels, the set of the logical tunnels having an ingress at the one of the VN nodes corresponding with the v-router associated with the set of the logical tunnels; and, indicate, at each v-router of the instantiated v-routers, a corresponding egress node for each logical tunnel of the set of logical tunnels.

25. The system of claim 24, the VN further configured to:
configure, for each v-router of the instantiated v-routers, a routing table associating, for said each logical tunnel of the set of logical tunnels, a destination VN node identifier corresponding to a VN node located at the egress node indicated for said each logical tunnel of the set of logical tunnels.

26. The system of claim 25, the VN being further configured to:
associate at least one of the v-routers with a connection management entity; and,
configure said at least one of the v-routers to adjust the routing table based on messages indicative of locations of mobile end points to be received from the connection management entity during VN operation.

27. The system of claim 23, further comprising the physical network nodes, wherein the network function is further configured to:
configure the physical network nodes to forward packets designating one of the logical tunnels toward a next physical network node associated with the designated logical tunnel, the next physical network node forming a next hop in a network path of the designated logical tunnel.

28. The system of claim 23, the network function further configured to:
determine a mapping between at least one logical tunnels and underlying physical network resources used for conveying packets via said at least one logical tunnel.

29. The system of claim 28, the network function being further configured to configure a resource allocation network operation function to assign physical network resources to support one or both of: operation of the VN nodes; and communication with edge nodes, said physical network resources assigned based on the determined QoS parameters.

30. The system of claim 23, further comprising the physical network nodes, the VN being configured to, for at least one of the logical tunnels, configuring each of a plurality of physical network nodes to forward received packets associated with said at least one of the logical tunnels to a specified next one of the plurality of physical network nodes.

31. The system of claim 23, the VN configured to instantiate one or more functions at one or more of the VN nodes, the functions including or more of: a packet aggregation function; a packet de-aggregation function; a firewall function; and an anchor point function.

32. The system of claim 23, each physical network node that is associated with a logical tunnel ingress but is not associated with a VN node being configured to:
assign a destination VN Node ID corresponding to a connected VN Node connected to an opposing logical tunnel egress;
assign a service ID corresponding to the configured interconnecting logical tunnel; and
configure that physical network node to inspect received data packets for the service ID, and to direct the received data packets to the logical tunnel ingress for delivery to the connected VN Node that corresponds with the destination VN Node ID.

33. The system of claim 23, the network function further configured to:
Set a QoS for the inspection, direction, and delivery of the received data packets.

34. The system of claim 33 wherein the QoS comprises a measure of at least one of: a total throughput, and a latency of the logical tunnel.

* * * * *